(12) United States Patent
Nishimura

(10) Patent No.: US 10,559,073 B2
(45) Date of Patent: Feb. 11, 2020

(54) MOTION ADAPTIVE STREAM PROCESSING FOR TEMPORAL NOISE REDUCTION

(71) Applicant: INTEL CORPORATION, Santa Clara, CA (US)

(72) Inventor: Jun Nishimura, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 15/078,735

(22) Filed: Mar. 23, 2016

(65) Prior Publication Data
US 2017/0278225 A1    Sep. 28, 2017

(51) Int. Cl.
*G06T 5/50*    (2006.01)

(52) U.S. Cl.
CPC ...... *G06T 5/50* (2013.01); *G06T 2207/20182* (2013.01)

(58) Field of Classification Search
CPC .. G06T 5/50; G06T 5/002; G06T 2207/20182
See application file for complete search history.

(56) References Cited

U.S. PATENT DOCUMENTS

| | | | | |
|---|---|---|---|---|
| 5,038,388 A * | 8/1991 | Song | ................. | G06T 5/004 382/266 |
| 5,442,407 A * | 8/1995 | Iu | ...................... | G06T 5/20 348/416.1 |
| 5,867,606 A * | 2/1999 | Tretter | ................... | G06T 5/004 358/447 |
| 7,130,481 B2 * | 10/2006 | Yu | ...................... | G06T 5/002 382/261 |
| 8,374,457 B1 * | 2/2013 | Wang | .................. | G06T 5/002 382/260 |
| 8,767,127 B2 * | 7/2014 | McCarthy | ............. | G06T 5/002 348/606 |
| 8,830,360 B1 * | 9/2014 | Burt | ...................... | H04N 5/21 348/241 |
| 8,963,949 B2 * | 2/2015 | Forutanpour | ............ | G06T 5/50 345/611 |
| 9,214,031 B2 | 12/2015 | Zhao et al. | | |
| 9,449,374 B2 * | 9/2016 | Nash | .................. | H04N 5/23229 |
| 9,509,993 B2 * | 11/2016 | Yokokawa | ............. | H04N 19/51 |
| 2004/0264795 A1 * | 12/2004 | Fielding | ................ | G06T 11/001 382/254 |
| 2005/0013509 A1 * | 1/2005 | Samadani | ............ | G06T 3/4007 382/302 |
| 2010/0309345 A1 * | 12/2010 | Zimmer | .................. | G06T 5/002 348/242 |

(Continued)

OTHER PUBLICATIONS

International Search Report & Written Opinion dated Aug. 9, 2017 for PCT Patent Application No. PCT/US17/18072.

(Continued)

*Primary Examiner* — Xuemei G Chen
(74) *Attorney, Agent, or Firm* — Green, Howard & Mughal LLP.

(57) ABSTRACT

Techniques related to temporal noise reduction of images are discussed. Such techniques may include generating a noise stream corresponding to an input image and adaptively re-combining the noise stream with a reference image corresponding to the input image and a spatially noise reduced image corresponding to the input image to generate a temporal noise reduced output image.

25 Claims, 9 Drawing Sheets

(56) References Cited

U.S. PATENT DOCUMENTS

| | | | |
|---|---|---|---|
| 2011/0115951 A1* | 5/2011 | Hong | G06K 9/40 |
| | | | 348/241 |
| 2011/0249151 A1* | 10/2011 | Ito | G06T 5/002 |
| | | | 348/241 |
| 2011/0268328 A1* | 11/2011 | Bar-Aviv | G06T 5/50 |
| | | | 382/128 |
| 2012/0200754 A1* | 8/2012 | Fainstain | G06T 5/002 |
| | | | 348/302 |
| 2013/0177253 A1* | 7/2013 | Batur | H04N 19/80 |
| | | | 382/236 |
| 2013/0194403 A1* | 8/2013 | Higuchi | H04N 5/23251 |
| | | | 348/65 |
| 2013/0202177 A1* | 8/2013 | Bar-Aviv | G06T 11/008 |
| | | | 382/131 |
| 2013/0251282 A1 | 9/2013 | Min | |
| 2014/0192267 A1 | 7/2014 | Biswas et al. | |
| 2014/0270568 A1 | 9/2014 | Hutchison et al. | |
| 2016/0037059 A1* | 2/2016 | Lim | G06T 5/002 |
| | | | 348/241 |
| 2016/0071245 A1* | 3/2016 | Bergner | G06T 5/002 |
| | | | 382/131 |
| 2016/0080613 A1 | 3/2016 | Nagano | |
| 2017/0109867 A1* | 4/2017 | Milshteyn | G06T 5/002 |
| 2017/0163853 A1* | 6/2017 | Hata | H04N 5/217 |
| 2017/0264861 A1* | 9/2017 | Xu | H04N 5/145 |
| 2018/0150959 A1* | 5/2018 | Vivet | G06T 5/002 |

OTHER PUBLICATIONS

International Preliminary Report on Patentability for International Patent Application No. PCT/US17/18072, dated Oct. 4, 2018.

* cited by examiner

MOTION ADAPTIVE STREAM PROCESSING FOR TEMPORAL NOISE REDUCTION

BACKGROUND

In image processing contexts, particularly in low light conditions, spatial noise reduction may not accurately reduce noise as there is difficulty in distinguishing detail and noise. The use of strong spatial noise reduction (SPNR) may result in either a blurry image with a loss of detail or a noisy image. In such conditions, temporal noise reduction (TNR) may provide higher image and/or video quality.

However, temporal noise reduction techniques may have difficulties reducing noise for fast moving objects and/or for occluded regions (e.g., image regions that were obstructed in a previous image and revealed in a current image). Such fast moving objects and/or occluded regions may not have good matches in the reference image, providing difficulty in applying temporal noise reduction.

It may be advantageous to perform improved temporal noise reduction for images, which may improve image quality by reducing noise in static regions (e.g., those image regions that are not changing in the current image with respect to previous image(s)), moving regions (e.g., those image regions that are moving in the current image with respect to previous image(s)), and occluded regions (e.g., image regions that were obstructed in a previous image and revealed in a current image) without sacrificing detail level. It is with respect to these and other considerations that the present improvements have been needed. Such improvements may become critical as the desire to attain high quality images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
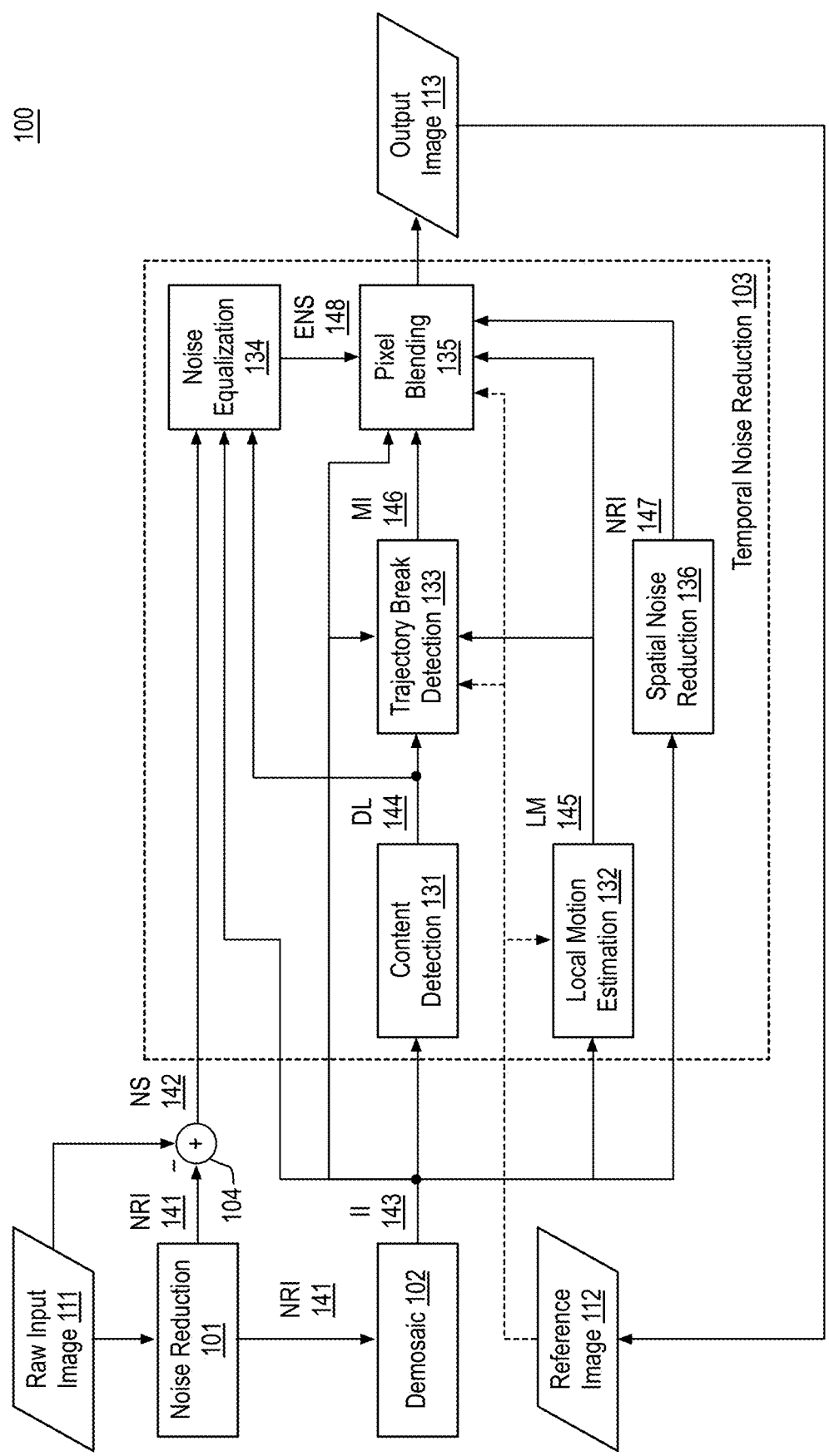
FIG. 1 illustrates an example system for providing temporal noise reduction.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to motion adaptive stream processing for temporal noise reduction and, in particular, to generating and adaptively applying a noise stream for improved temporal noise reduction.

As described above, in imaging processing contexts, particularly in low light conditions, temporal noise reduction may provide improved image quality. As discussed, in some embodiments, the techniques discussed herein may provide for improved temporal noise reduction based on generating and adaptively applying a noise stream. Such techniques may improve image quality by reducing noise in static regions (e.g., those image regions that are not changing in the current image with respect to previous image(s)), moving regions (e.g., those image regions that are moving in the current image with respect to previous image(s)), and occluded regions (e.g., image regions that were obstructed in a previous image and revealed in a current image) without sacrificing detail level.

In some embodiments, an input image may be received and a noise reduced image may be generated based on a noise reduction of an input image. The input image may be any suitable input image (e.g., an image, a video frame, or the like) that has been demosaiced or that is in a color filter array domain (e.g., that has not been demosaiced). For example, the input image may be an RGB image, a YUV image, an image in any YUV variant color space, or the like. The noise reduction of the input image may be performed using any suitable spatial noise reduction technique or techniques. A noise stream corresponding to the input image may be generated based on the input image and the noise reduced image. For example, the noise stream may be the difference between the noise reduced image and the input image. The noise stream may have any suitable data structure. For example, the noise stream may provide noise values for each pixel location corresponding to the input image. The noise stream may be applied to a luma channel or any chroma channel as is discussed herein.

The noise stream may be adaptively combined with an input image, a reference image corresponding to the input image (e.g., a previously temporal noise reduced image), the noise reduced image, and/or a spatially noise reduced image generated based on a spatial noise reduction of the noise reduced image. For example, the noise stream, the reference image, the noise reduced image, and the further noise reduced image may be combined using pixel blending techniques adaptive to motion information such as local motion or the like corresponding to the input image. Such motion information may be generated using any suitable technique or techniques. For example, the noise stream may be highly applied to those regions showing little or no motion and the noise stream may be attenuated (or not applied at all) to those regions showing fast motion or no motion matching. Such techniques may advantageously provide for little noise (e.g., greater spatial noise reduction) for those regions that are fast moving or that were previously occluded as the noise stream is not added back in for those regions and greater noise (e.g., more perceived detail) for those regions that are static. Furthermore, such techniques may provide for applying stronger spatial noise reduction prior to temporal noise reduction (e.g., prior to the temporal noise reduction component) to reduce noise in the moving regions, since the lost details may be added back in for the static regions.

Furthermore, prior to combining the noise stream, the noise stream may be equalized and/or adjusted based on one or more of a local luminance corresponding to the input image, a local chrominance corresponding to the input image, detected content corresponding to the input image, a radial distance from an optical center of the input image, and/or a user preference. For example, the noise stream may be attenuated in lower luminance areas (e.g., noise may be smaller in bright regions than dark regions and noise may be attenuated in dark regions) or lower chrominance areas, flatter areas (e.g., low detected content level areas), and at greater distances from the optical center of the input image and the noise stream may be left unchanged or enhanced in higher luminance areas, higher chrominance areas, texture areas (e.g., high detected content level areas), and at lower distances from the optical center of the input image. Furthermore, the noise stream may be attenuated, left unchanged, or enhanced based on user preference.

The techniques discussed herein may introduce a noise stream (e.g., a difference signal between a spatial noise reduction input and output), which may be added back to the image adaptive to local motion level, detail level, noise characteristics (e.g., noise level dependency on local luminance, chrominance, and/or radial distance from the optical center), and/or user preference. Such techniques may be particularly advantageous in low light or extreme low light conditions. The characteristics of such low light or extreme low light conditions may depend on the optical capabilities of the image capture device and may include light conditions below 0.1 lux, below 1.0 lux, below 20 lux, or the like.

FIG. 1 illustrates an example system 100 for providing temporal noise reduction, arranged in accordance with at least some implementations of the present disclosure. As shown in FIG. 1, system 100 may include a noise reduction module 101, a demosaic module 102, and a temporal noise reduction module 103, which may include a content detection module 131, a local motion estimation module 132, a trajectory break module 133, a noise equalization module 134, a pixel blending module 135, and a spatial noise reduction module 136. System 100 may be implemented via any suitable device such as, for example, a personal computer, a laptop computer, a tablet, a phablet, a smart phone, a digital camera, a gaming console, a wearable device, a display device, an all-in-one device, a two-in-one device, a surveillance device, or the like or platform such as a mobile platform or the like. For example, as used herein, a system, device, computer, or computing device may include any such device or platform.

Also as shown, system 100 (e.g., via noise reduction module 101) may receive raw input image 111 and system 100 may provide (e.g., via pixel blending module 135 of temporal noise reduction module 103) an output image 113, which may be characterized as a temporal noise reduced output image or the like. Noise reduction module 101 may include a single luma noise reduction module, a luma noise reduction module and one or more chroma reduction modules, or one or more chroma reduction modules depending on the format of raw input image 111 and the channel or domain in which noise reduction is being implemented (e.g., a luma channel only, a luma channel and one or more chroma channels, or one or more chroma channels). Raw input image 111 may include any suitable image data, video frame data, or the like in any suitable domain. For example, raw input image 111 may include data from an image sensor or from an image preprocessor including a particular color value for each pixel location such that raw input image 111 may be in a color array filter space. For example, raw input image 111 may include a red, green, or blue value for each pixel location according to a pattern of a color filter space. Although illustrated with respect to raw input image 111 being an input image in a color array filter space, raw input image 111 may be any suitable image data such as demosaiced image data, image data in the red, green, blue (RGB) color space, image data in a luma chrominance color space such as the YUV color space, a YUV variant color space, or the like. In an embodiment, demosaic module 102 may be applied before noise reduction module 101. In various examples, raw input image 111 may be received from a camera, camera array, image preprocessor, or the like.

As shown, a noise reduced image (NRI) 141 may be generated based on a noise reduction of raw input image 111. The noise reduction of raw input image 111 may be performed using any suitable technique or techniques. For example, the noise reduction of raw input image 111 may be performed based on filtering techniques (e.g., linear or non-linear filtering), anisotropic diffusion techniques, non-local averaging techniques, or a combination thereof. Also as shown, based on a difference between noise reduced image 141 and raw input image 111, as determined by differencer 104, a noise stream (NS) 142 may be generated. Noise stream 142 may include any suitable data or data structure. In an embodiment, noise stream 142 may provide a noise value for each pixel location of raw input image 111, for regions of raw input image 111, or the like. In an embodiment, noise stream 142 may include a noise value for each color channel for each pixel location of an input image. Noise stream 142 may include a high frequency signal containing noise and detail information of raw input image 111. By providing noise stream 142, noise reduction module 101 may provide noise reduced image 141 having less noise, which may provide fewer unwanted artifacts and/or more robust results in later processing such as demosaicing via demosaic module 102, local motion tracking via local motion estimation module 132, and so on. As is discussed further herein, detail contained in noise stream 142 may be adaptively added back in later stages to reproduce detail without degrading processing via intervening modules. Also as discussed further herein, noise stream 142 may be used with temporal noise reduction to reduce noise in moving or occluded regions and to increase detail in static regions by adaptively applying noise stream 142 based on local motion of raw input image 111.

Figure 2:
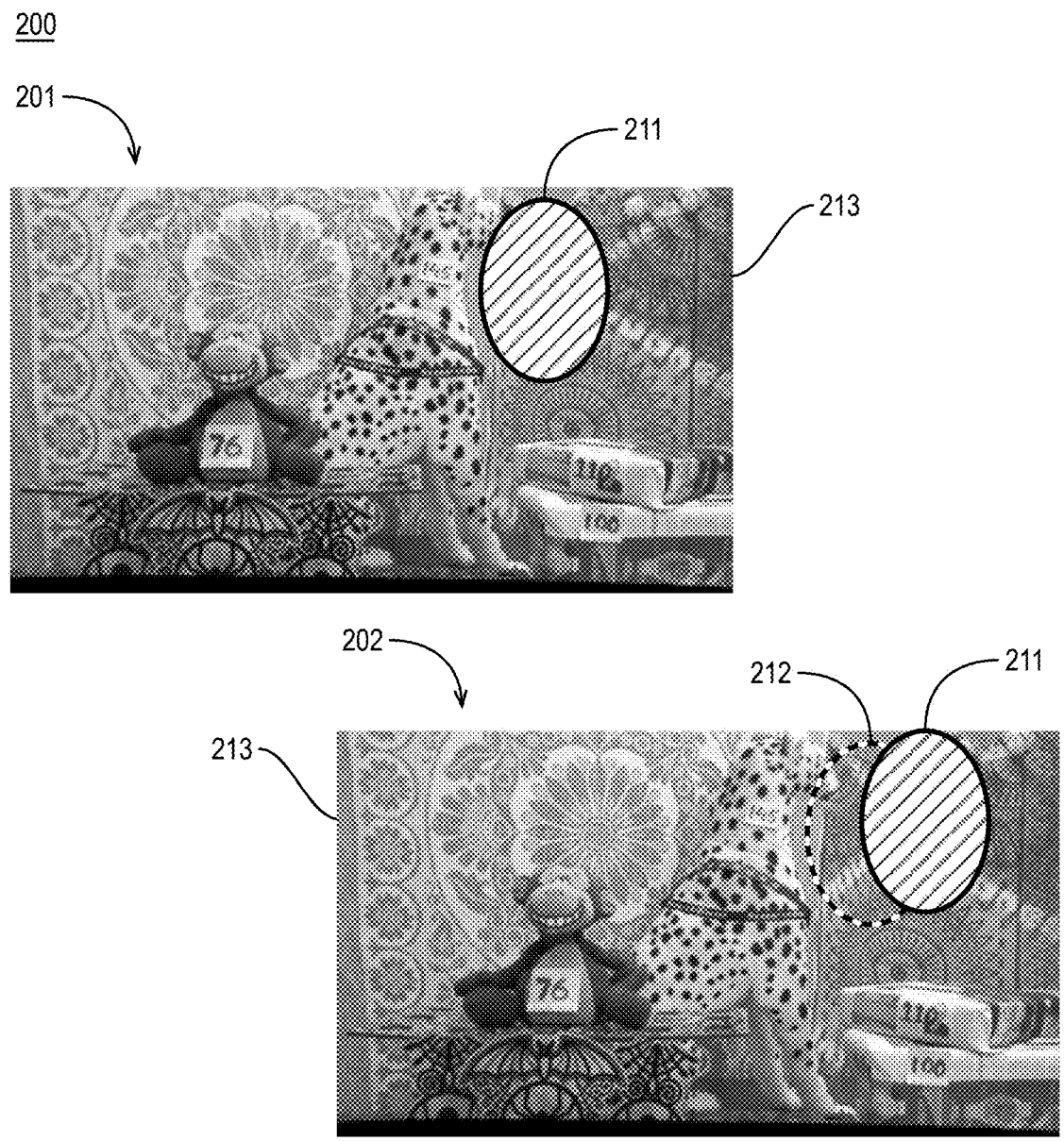
FIG. 2 illustrates example images for the application of temporal noise reduction.

FIG. 2 illustrates example images 200 for the application of temporal noise reduction, arranged in accordance with at least some implementations of the present disclosure. As discussed, images 200 may include any suitable images, pictures, or frames of video or the like or any suitable data representing images, pictures, or frames of video. For example, images 200 may include any suitable image or imaging data. Input images 200 may be in any suitable format and/or color space. In the illustrated example, images 200 include images of an indoor environment; however, images 200 include images of any suitable scene including any suitable subjects. As shown, images 200 may include an image 201 and an image 202 such that image 202 is subsequent to image 201. Images 201, 202 may include a moving object 211 and a static region 213 (e.g., the regions outside of moving object 211). Also as shown with respect to image 202, the motion of moving object 211 (e.g., which has moved up and to the right) may provide an occluded region 212 such that occluded region 212 was occluded by moving object 211 in image 201 and revealed in image 202.

Using the techniques discussed herein, a noise stream (e.g., noise stream 142) may be adaptively combined through pixel blending to generate a higher quality output image. For example, with respect to image 202, noise may be advantageously applied in higher amounts to static region 213 (e.g., those regions with minimal or no motion). Providing noise in static region 213, which has well established temporal noise reduction over several frames since it is static, may provide detail. For example, since strong temporal noise reduction may be applied in static regions, having more noise will contribute to a detail level improvement in such regions. Furthermore, noise may be advantageously attenuated (or not applied at all) in the region corresponding to moving object 211 in image 202 and in occluded region 212 such that spatial noise reduction (as applied via other modules of the temporal noise reduction) may provide smoothing of the noise in those regions.

Furthermore, the noise stream may be equalized and/or adjusted based on other features of image 202. For example, the noise stream may be attenuated in low local luminance areas (as determined by local luminance averaging), in low local chrominance areas (as determined by local chrominance averaging), flat areas (as determined via content detection), and at locations radially distant from a center of image 202. Such attenuation may advantageously reduce noise in dark areas (where noise is more often pronounced), flat areas (where noise may provide unwanted artifacts), and in areas radially distant from an image center (where noise may be more pronounced due to lens shading corrections). Similarly, the noise stream may be unchanged (or enhanced) in high local luminance areas (as determined by local luminance averaging where noise may not be as pronounced), high local chrominance areas (as determined by local chrominance averaging), texture areas (as determined via content detection such that more detail may be provided or perceived due to noise), and at locations radially near a center of image 202 (where noise may not be as influenced by lens shading corrections).

Returning to FIG. 1, as discussed, noise stream 142 may be in a color array filter space or in any other color space. For example, noise reduction module 101 may be provided at an early stage of an image processing pipeline (e.g., prior to demosaic module 102) and system 100 may utilize the results of such noise reduction to generate noise stream 142. In other examples, demosaicing may be performed prior to noise reduction and differencing to generate noise stream 142. As discussed, raw input image may be in any suitable color space or domain. Furthermore, as shown, noise stream 142 may be determined as the difference of a noise reduction input and output (e.g., a difference between raw input image 111 and noise reduction image 142). Noise stream may be in any suitable color space or domain. Noise stream may be in a luma channel only, in a luma channel and one or more chroma channels, or in one or more chroma channels. Noise stream 142 may be provided to noise equalization module 134, which may equalize or adjust noise stream 142 to generate an equalized noise stream 148 as discussed further herein. For example, noise equalization module 134 may compensate for dependencies in noise stream 142. Furthermore, pixel blending module 135 may adaptively re-combine noise equalized noise stream 148 to the input signal of raw input image 111 based on motion information as provided by local motion estimation module 132 and/or trajectory break detection module 133 as discussed further herein. Such re-combining of noise equalized noise stream 148 may be provided to a luma channel of the input signal of input image 111 and/or to a chroma channel of the input signal of input image 111. For example, system 100 may include a spatial noise reduction module for luma and/or a spatial noise reduction for chroma (e.g., via noise reduction module 101). In some embodiments, a chroma noise stream may be taken from an input and the output of the spatial noise reduction for chroma as discussed with respect to noise reduction module 101 and differencer 104. The luma and chroma noise streams may be used separately or they may be combined for application via pixel blending module 135 after optional processing by noise equalization module 134.

As shown, noise reduced image 141 may be provided to demosaic module 102. Demosaic module 102 may demosaic noise reduced image 141 to generate input image (II) 143 using any suitable technique or techniques. For example, demosaic module 102 may interpolate color values for each pixel missing a particular color value in noise reduced image 141. For example, for those pixels having blue values but missing a red and a green value, such red and green values may be determined, for those pixels having red values but missing a blue and a green value, such blue and green values may be determined, and for those pixels having green values but missing a red and a blue value, such red and blue values may be determined. Furthermore, demosaic module 102 or other modules of system 100 may provide gamma correction, color correction, image enhancement, or the like to generate input image 143. In some embodiments, input image 143 may be provided in or converted to another color space such as the YUV color space for further processing. For example, input image 143 may include a luma and chrominance components. As discussed, in some embodiments, demosaicing may be performed before noise reduction such that noise signal 142 may be generated based on a demosaiced and, optionally, a gamma corrected, color corrected, and/or image enhanced image.

Content detection module 131 may receive input image 143 and content detection module 131 may perform content detection based on input image 143 to generate detail level 144. Content detection module 131 may perform content detection using any suitable technique or techniques and detail level 144 may include any suitable data or data structure representative of the content or detail of input image 111. For example, detail level 144 may include a value for each pixel location of input image 143 indicating a detail level with high values representing texture or edge pixels or regions and low values representing flat regions. As discussed, detail level 144 may be provided on a pixel-by-pixel basis. In some examples, detail level 144 may be provided on a region-by-region basis such that regions of input image 143 are represented by a single detail level value. As discussed, detail level 144 may include any suitable data or data structure. In some examples, detail level 144 may be characterized as detail values, content level values, a content level map, or the like. As shown, detail level 144 may be provided to noise equalization module 134 for adjusting noise stream 142 as discussed herein.

Local motion estimation module 132 may receive input image 143 and a reference image 112 (e.g., a previously noise reduced output image as shown). Local motion estimation module 132 may generate local motion 145 based on input image 143 and reference image 112 using any suitable technique or techniques. For example, local motion 145 may be generated based on block matching techniques or the like. Local motion 145 may include any data or data structures representative of local motion in input image 143 with respect to reference image 112. In an embodiment, local motion 145 may include a motion vector field providing an approximated motion vector (e.g., having a horizontal and vertical component) for each pixel of input image 143 or for regions of input image 143. In an embodiment, local motion 145 may include motion values for pixels or regions of input image 143, which represent an estimation of whether motion is present in input image 143 with respect to reference image 112.

As shown, local motion 145 (and reference image 112 and input image 143 as needed) may be provided to pixel blending module 135 and trajectory break detection module 133, which may generate motion information 146. In an embodiment, trajectory break detection module 133 may track motion across images (e.g., several instances of input images) to determine whether local motion 145 at particular pixels provides actual motion or mistakenly estimated motion. For example, at local estimation module 132, for a particular pixel or region, local estimation module 132 may provide a motion confidence value or the like representative of confidence level that input image 143 and reference image 112 are similar to each other after the application of local motion 145. For example, in some cases, a best guess or closest match motion vector of local motion 145 may be an erroneous match. Trajectory break detection module 133 may, as discussed, track motion across images and trajectory break detection module 133 may zero out or adjust any motion that does not have a smooth tracking over time (e.g., broken motion) to eliminate or reduce such mismatches. For example, trajectory break detection module 133 may support the detection of occluded regions in input image 143. In embodiments where local motion 145 is not available, motion information 146 may provide values indicating a confidence level that input image and reference image 112 are similar to each other without application of local motion. In such contexts, motion information 146 may provide high values for locations where there is no motion and lower values for locations when there is motion.

Motion information 146 may include any data or data structures representative of local motion in input image 143 with respect to reference image 112. For example, motion information 146 may include motion confidence values based on input image 143 and reference image 112 as discussed. In some examples, local motion 145 and/or motion information 146 may be characterized as motion vectors, a motion vector field, motion values, local motion information, a motion map, motion confidence values, local motion confidence maps, or the like. As shown, local motion 145 and/or motion information 146 may be provided to pixel blending module 135 for adaptive application of equalized noise stream 148 as discussed herein.

Spatial noise reduction module 136 may also receive input image 143 and spatial noise reduction module 136 may provide spatial noise reduction using any suitable technique or techniques to generate noise reduced image 147. For example, the noise reduction of input image 143 may include filtering techniques (e.g., linear or non-linear filtering), anisotropic diffusion techniques, non-local averaging techniques, or the like. Such spatial noise reduction of input image 143 within temporal noise reduction module 103 may provide additional smoothing or noise reduction for fast motion regions or occluded regions. Furthermore, noise stream 142 may be re-applied or combined in static regions as discussed herein.

As discussed, it may be advantageous to equalize and/or adjust noise stream 142 to generate equalized noise stream 148 via noise equalization module 134 of temporal noise reduction module 103. Such equalizing and/or adjusting of noise stream 142 may be based on local luminance, local chrominance, detected content, a radial distance from an optical center, a user preference, or the like.

Figure 3:
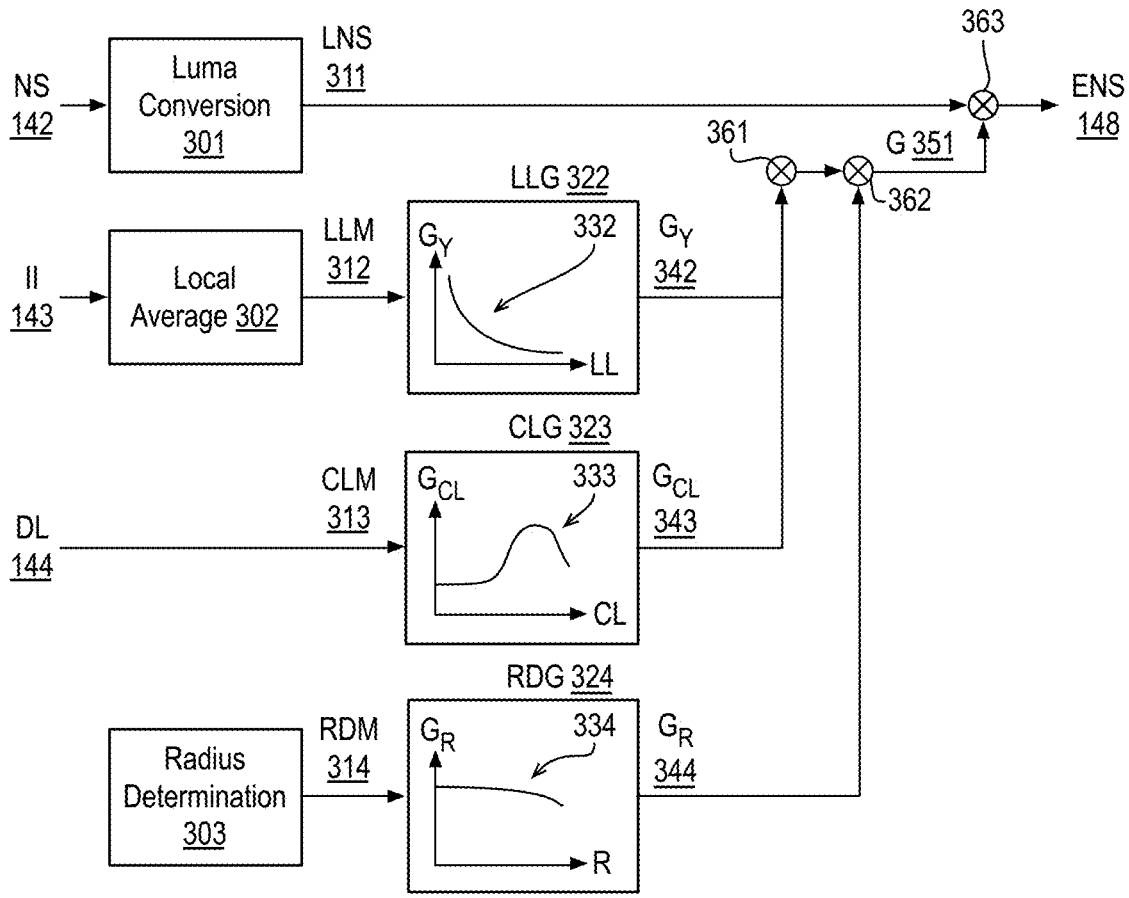
FIG. 3 illustrates an example noise equalization component.

FIG. 3 illustrates an example noise equalization component 300, arranged in accordance with at least some implementations of the present disclosure. For example, noise equalization component 300 may be implemented via noise equalization module 134 of system 100. As shown, noise equalization component 300 may receive noise stream 142, input image 143, and detail level 144 and noise equalization component 300 may generate equalized noise stream 148.

As shown, noise stream 142 may be received by luma conversion module 301, which may convert noise stream 142 to a luma domain or component to generate luma noise stream 311. As discussed, noise stream 142 may be in a color filter array domain, color domain, or the like and luma conversion module 301 may convert noise stream 142 to a luma domain or component. In examples where noise stream 142 is provided in the luma domain or as a luma component, luma conversion module 301 may be skipped. Furthermore, in examples where noise stream 142 is implemented in a chroma domain, luma conversion module 301 may be skipped. Luma conversion module 301 may convert noise stream 142 to luma noise stream 311 using any suitable technique or techniques. In an embodiment, luma conversion module 301 may be a low pass filter.

Also as shown, input image 143 may be received by local averaging module 302, which may perform local averaging of a luma component of input image 143 to generate a local luminance map 312. As discussed, input image 143 may be in any suitable color domain. In some examples, input image 143 may include a luma component and, in other examples, input image 143 may be converted to a domain having a luma component or a luma component may be extracted. Local averaging module 302 may generate local luminance map 312 using any suitable technique or techniques. For example, local averaging module 302 may provide a local averaging in a window (e.g., a 2×2 pixel window such that the local average or mean may be characterized as $\mu_{2\times2}$) around each pixel of input image 143 to generate local luminance map 312. In an embodiment, local averaging module 302 may not be included and input image 143 may be used as local luminance map 312. Such embodiments may advantageously save computation complexity and cost. Local luminance map 312 may include any data or data structure representative of local luminance of input image 143 such as a local average luminance value for each pixel location of input image 143.

Local luminance map 312 may be provided to local luminance gain module 322, which may generate local luminance gain values ($G_y$) 342 by applying a local luminance to local luminance gain mapping 332. For example, for each pixel value of local luminance map 312, local luminance gain module 322 may generate a local luminance dependent gain value of local luminance gain values 342 by applying local luminance gain mapping 332. As shown, local luminance gain mapping 332 may provide for higher gain values for higher luminance areas (e.g., having lower luminance values indicating higher luminance) and lower gain values for low luminance areas (e.g., having higher luminance values indicating lower luminance) based on a concave upward curve such that noise stream 142 may be attenuated in lower luminance areas of input image 143 (e.g., where noise may cause poor image quality). Local luminance gain mapping 332 may be applied using any suitable technique or techniques such as a look up table a determination step based on a function or the like.

In examples where noise stream 142 includes a chroma noise stream (e.g., in addition or in alternative to a luma noise stream), input image 143 may be received by a local chroma averaging module (not shown) which may perform local averaging of a chroma component of input image 143 to generate a local chrominance map (not shown) or input image 143 may be used as a local chrominance map. The local chrominance map may include any data or data structure representative of local chrominance of input image 143. In analogy to local luminance map 312, local luminance gain module 322, and local luminance gain mapping 322, the local chrominance map may be provided to a local chrominance gain module (not shown), which may generate local chrominance gain values (not shown) by applying a local chrominance mapping (not shown). For example, for each pixel value of the local chrominance map, a local chrominance dependent gain value may be determined. The local luminance gain mapping may provide for lower gain values for lower chrominance areas and higher gain values for higher chrominance areas based on a concave upward curve as shown with respect to local luminance gain mapping 332 such that noise stream 142 may be attenuated in lower chrominance areas of input image 143 (e.g., where noise may cause poor image quality).

Furthermore, detail level 144 may be received via content detection module 131 (please refer to FIG. 1). In some examples, noise equalization component 300 may implement content detection module 131 or the like, which may generate detail level 144 or content level map 313 as discussed herein. As shown, in some examples, detail level 144 may be characterized as content level map 313. In other examples, detail level 144 may be converted to generate content level map 313. Content level map 313 may include any data or data structure representative of content levels of input image 143 such as a detail or content level value for each pixel location of input image 143 such that higher values indicate texture, edges, or the like and lower values indicate flat regions.

Content level map 313 may be provided to content level gain module 323, which may generate content level gain values ($G_{CL}$) 343 by applying a content level to content level gain mapping 333. For example, for each pixel value of content level map 313, content level gain module 323 may generate a content level dependent gain value of content level gain values 343 by applying content level gain mapping 333. As shown, content level gain mapping 333 may provide for higher gain values for higher content level values and lower gain values for lower content level values based on a concave downward curve having a flat portion at lower content level values such that noise stream 142 may be attenuated in lower content level areas of input image 143 (e.g., where noise can cause artifacts) and left unchanged or enhanced in higher level content areas of input image 143 (e.g., where noise may provide detail). Content level gain mapping 333 may be applied using any suitable technique or techniques such as a look up table a determination step based on a function or the like.

Also, radius determination module 303 may generate a radial distance map 314, which may provide for a radial distance from an optical center of input image 143. Radius determination module 303 may generate radial distance map 314 using any suitable technique or techniques. For example, radius determination module 303 may generate radial distance map 314 based on the optics system used to generate input image 143 or the like. Radial distance map 314 may include any data or data structure representative of radial distance such as a distance value from optical center for each pixel location of input image 143.

Radial distance map 314 may be provided to radial distance gain module 324, which may generate radial distance gain values ($G_R$) 344 by applying a radial distance to radial distance gain mapping 334. For example, for each pixel value of radial distance map 314, radial distance gain module 324 may generate a radial distance dependent gain value of radial distance gain values 344 by applying radial distance gain mapping 334. As shown, radial distance gain mapping 334 may provide for higher gain values for lower radial distance values and lower gain values for higher radial distance values based on a shallow concave downward curve such that noise stream 142 may be attenuated at distances further from the optical center of input image 143 (e.g., where noise can be caused by lens shading correction). Radial distance gain mapping 334 may be applied using any suitable technique or techniques such as a look up table a determination step based on a function or the like.

As shown, luminance gain values 342 and/or chrominance gain values, content level gain values 343, and radial distance gain values 344 may be combined by multipliers 361 and 362 to generate final gain values (G) 351. Luminance gain values 342 and/or chrominance gain values, content level gain values 343, and content level gain values 343 may be combined using any suitable technique or techniques such as multiplication as shown or other techniques. Final gain values 351 may include any suitable data or data structure such as a gain value for each pixel of input image 143. Furthermore, final gain values 351 may be applied to luma noise stream 311 and/or a chroma noise stream by multiplier 363. Final gain values 351 may be applied to luma noise stream 311 and/or a chroma noise stream using any suitable technique or techniques such as multiplication as shown or other techniques to provide equalized noise stream 148. Equalized noise stream 148 may include a noise value for each pixel of input image 143. Furthermore, although not shown in FIG. 3, a user preference (e.g., an application user or an application developer) gain may be applied to noise stream 142 via a user preference mapping and/or a multiplier. For example, a user preference may be applied to each pixel location to further attenuate noise or the like. Furthermore, user preferences may be provided by adjusting any of local luminance gain mapping 332, content level gain mapping 333, radial distance gain mapping 334, or the like.

Figure 4:
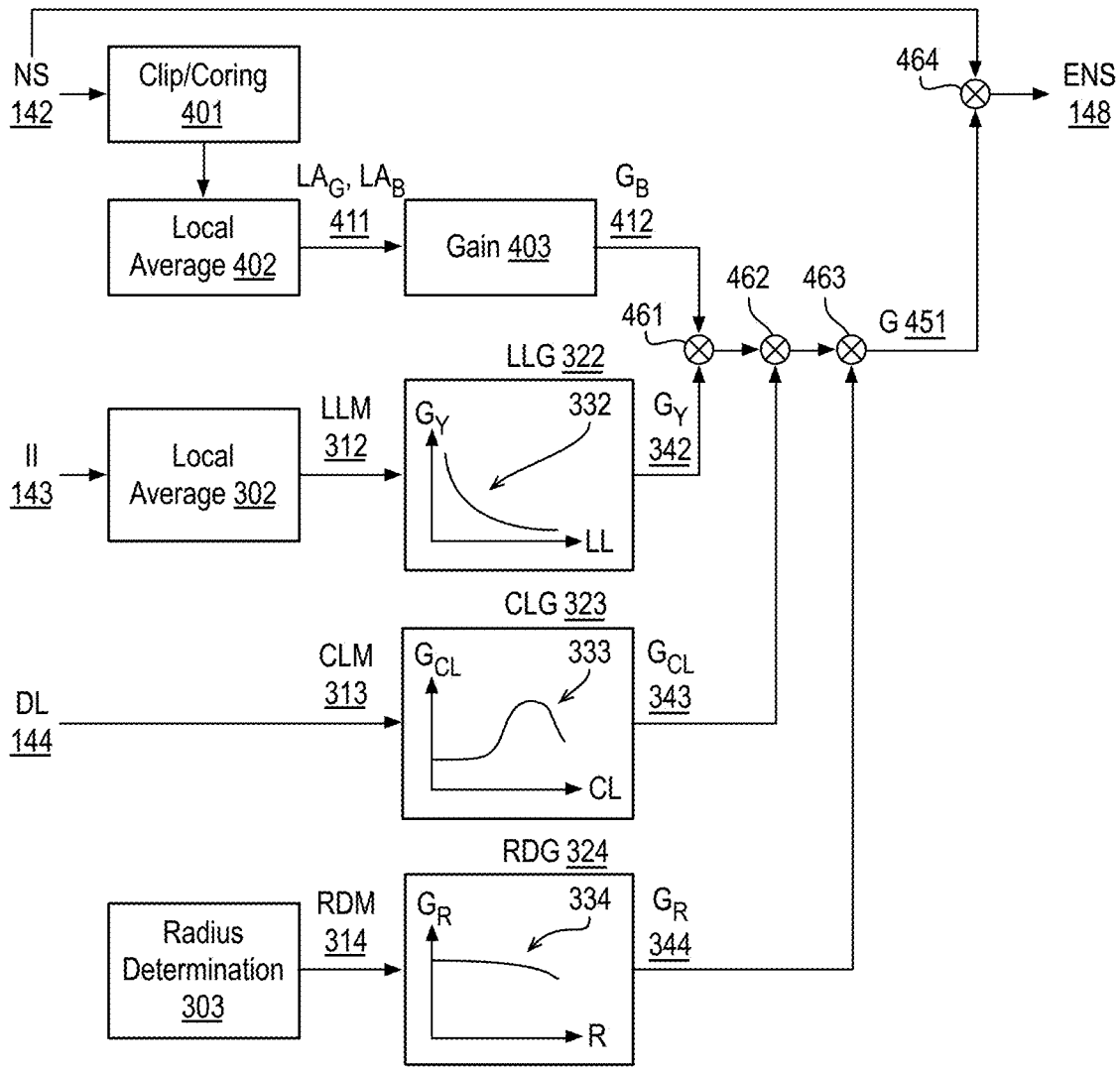
FIG. 4 illustrates another example noise equalization component.

FIG. 4 illustrates another example noise equalization component 400, arranged in accordance with at least some implementations of the present disclosure. For example, noise equalization component 400 may be implemented via noise equalization module 134 of system 100. As shown, noise equalization component 400 may receive noise stream 142, input image 143, and detail level 144 and noise equalization component 400 may generate equalized noise stream 148. Furthermore, noise equalization component 400 may implement local averaging module 302, local luminance gain module 322, a local chrominance averaging module (not shown), a local chrominance gain module (not shown), content level gain module 323 (and a content detection module or a conversion to content level mapping module as needed), radius determination module 303, and radial distance gain module 324, which may operate as discussed herein with respect to FIG. 3 to generate luminance gain values 342, chrominance gain values (not shown), content level gain values 343, and radial distance gain values 344. The operation of such modules will not be repeated for the sake of brevity.

Furthermore, as discussed, noise stream 142 may be in a color filter array domain. As shown, clip/coring module 401 may receive noise stream 142 and may provide clipping and/or coring of noise stream 142 and provide the resultant stream to local averaging module 402, which may generate a local green channel averages ($LA_G$) and local blue channel averages ($LA_B$) 411. Local averaging module 402 may generate local green channel averages and local blue channel averages 411 using any suitable technique or techniques. For example, local averaging module 302 may provide a local averaging in a window (e.g., a 5×5 pixel window such that the local average or mean may be characterized as $\mu_{5\times5}$) around each blue pixel location of noise stream 142. As shown, local green channel averages and local blue channel averages 411 may be provided to gain generation module 403, which may generate blue channel gain values ($G_B$) 412 based on local green channel averages and local blue channel averages 411 using any suitable technique or techniques. In an embodiment, blue channel gain values ($G_B$) 412 may be generated based on a ratio of the local green channel averages plus a conversion factor to the local blue channel values plus the conversion factor (e.g., $G_B=(\mu_{G+\varepsilon})/(\mu_{B+\varepsilon})$, where $\mu_G$ and $\mu_B$ may be the local green and blue channel averages, respectively, and $\varepsilon$ may be the conversion factor). For example, blue channel gain values 412 may equalize or normalize noise stream 142 to a blue channel of the noise stream.

As shown, blue channel gain values 412, luminance gain values 342, chrominance gain values (not shown), content level gain values 343, and radial distance gain values 344 may be combined by multipliers 461, 462, and 463 to generate final gain values (G) 451. Blue channel gain values 412, luminance gain values 342, content level gain values 343, and radial distance gain values 344 may be combined using any suitable technique or techniques such as multiplication as shown or other techniques. Final gain vales 451 may include any suitable data or data structure such as a gain value for each pixel of input image 143. Furthermore, final gain values 451 may be applied to noise stream 142 by multiplier 464. Final gain values 451 may be applied to noise stream 142 using any suitable technique or techniques such as multiplication as shown or other techniques to provide equalized noise stream 148. As discussed above, equalized noise stream 148 may include a noise value for each pixel of input image 143. Furthermore, although not shown in FIG. 4, a user preference (e.g., an application user or an application developer) gain may be applied to noise stream 142 via a user preference mapping and/or a multiplier. For example, a user preference may be applied to each pixel location to further attenuate noise or the like. Furthermore, user preferences may be provided by adjusting any of local luminance gain mapping 332, content level gain mapping 333, radial distance gain mapping 334, or the like.

Returning to FIG. 1, as shown, pixel blending module 135 may receive equalized noise stream 148, input image 143, reference image 112, noise reduced image 147, local motion 145, and motion information 146. Pixel blending module 135 may blend equalized noise stream 148, input image 143, reference image 112, and/or noise reduced image 147 based on local motion 145 and/or motion information 146 to generate output image 113, which may be provided as an output of system 100 and used as a reference image for a subsequent image received via raw input image 111 (if any). Pixel blending module 135 may blend equalized noise stream 148, input image 143, reference image 112, and/or noise reduced image 147 based on local motion 145 and/or motion information 146 using any suitable technique or techniques.

For example, as discussed, local motion 145 and/or motion information 146 may include motion information on a pixel-by-pixel or region-by-region basis for input image 143. For those pixels or regions having low motion (e.g., less than a threshold) or no motion, equalized noise stream 148 may be combined with a full weighting or a high weighting. For those pixels or regions having high motion (e.g., greater than a threshold), equalized noise stream 148 may be attenuated or not applied at all. Such techniques may apply a motion threshold and may apply equalized noise stream 148 based on whether a pixel or region is above or below the threshold. In other examples, equalized noise stream 148 may be attenuated as motion increases or multiple thresholds may be applied.

Furthermore, pixel blending module 135 may select weighting among input image 143, reference image 112, and noise reduced image 147 in addition to the weighting or selection of equalized noise stream 148. For example, pixel blending module 135 may weigh reference image 112 more heavily for regions where low or little motion is determined and to attenuate reference image 112 or not apply it at all for regions where there is motion. Furthermore, the weighting of input image 143 and noise reduced image 147 may be provided independent of motion information 146 or dependent on motion information 146 such that high motion regions may weigh noise reduced image 147 more heavily.

As discussed, pixel blending module 135 may control how much noise (e.g., via equalized noise stream 148) is added back to input image 143 to generate output image 113. For example, more noise or all available noise signal may be applied to static regions and no noise or an attenuated amount of the noise signal may be applied to fast motion regions and/or occluded regions.

Figure 5:
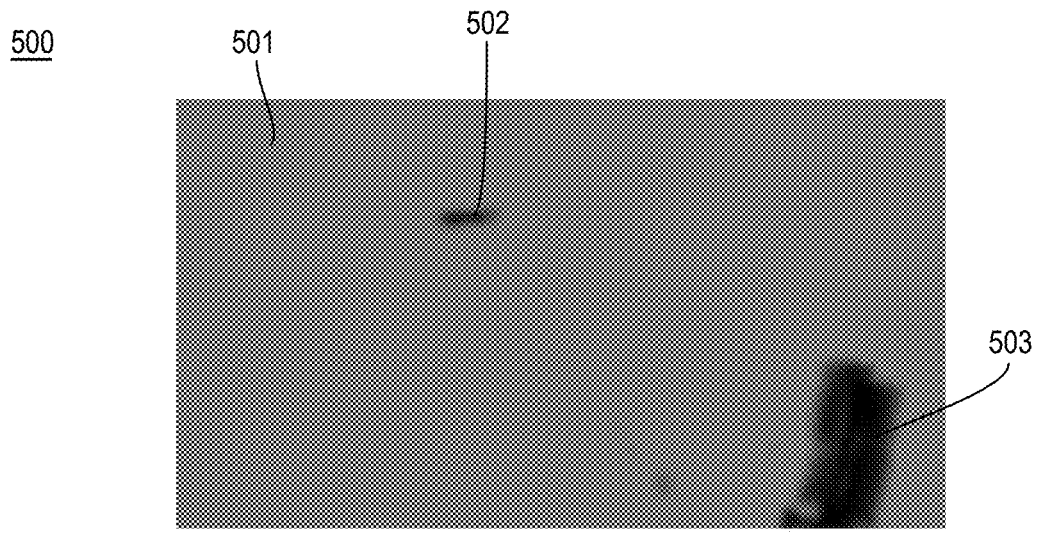
FIG. 5 illustrates example motion information.

FIG. 5 illustrates example motion information 500, arranged in accordance with at least some implementations of the present disclosure. As shown, motion information 500 may include static regions 501 (as indicated by gray in FIG. 5) and high motion or occluded regions 502, 503 (as indicated by black in FIG. 5). For example, high motion or occluded regions 502, 503 may include those regions for which no motion vector could be found, those regions for which a large motion vector, those regions for which a high probability of motion was determined, or the like. Such no motion vector regions may be due to an occlusion (e.g., no match could be found because the region was newly revealed) or fast motion where no motion vector could be found within the search limits provided by the local motion search. With reference to FIG. 1, equalized noise stream 148 may not be applied to high motion or occluded regions 502, 503 (or the application may be attenuated) and equalized noise stream 148 may be applied to static regions 501.

Figure 6:
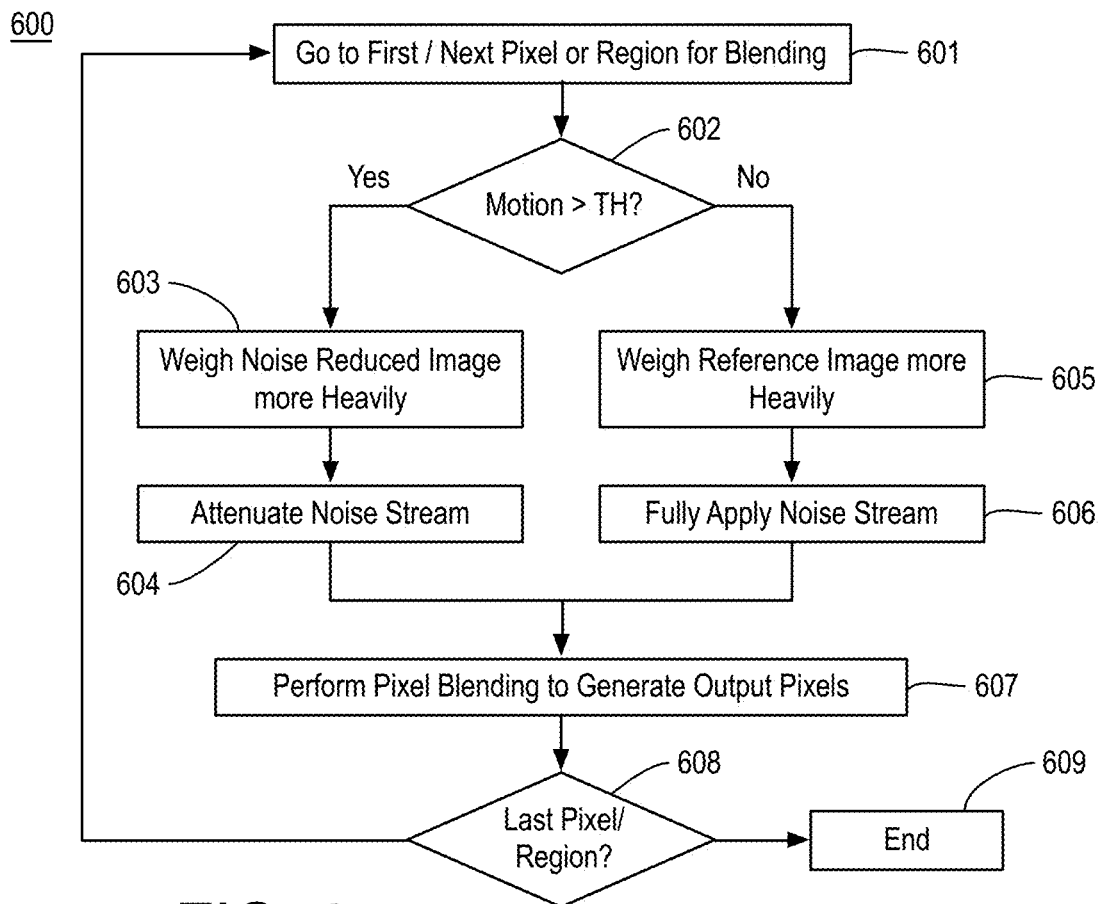
FIG. 6 illustrates an example process for combining a noise stream based on motion information.

FIG. 6 illustrates an example process 600 for combining a noise stream based on motion information, arranged in accordance with at least some implementations of the present disclosure. Process 600 may include one or more operations 601-609 as illustrated in FIG. 6. Process 600 may be performed by a system (e.g., system 100 or any other devices or systems discussed herein) or portions of process 600 may be performed by a system to combine a noise stream with an input image to generate an output image. Process 600 or portions thereof may be repeated for any number input images, frames of video, noise streams, or the like. For example, process 600 may provide a temporal noise reduced output image.

As shown, process 600 may begin at operation 601, where process 600 may begin or continue at a particular pixel or region for blending. Processing may continue at decision operation 602, where a determination may be made as to whether local motion for the particular pixel or region is above a threshold. The threshold may be any suitable predetermined threshold or heuristically determined threshold or the like.

If the amount of local motion is greater than the threshold (or equal to the threshold in some examples), processing may continue at operation 603, where a noise reduced image may be weighted more heavily in the pixel blending. For example, for pixels or regions of high motion, a spatially noise reduced image generated by the temporal noise reduction processing may be weighed more heavily such that such pixels or regions may have more smoothing and less noise. Furthermore, a reference image (e.g., prior temporal noise reduced image) may not be used at all in such regions as there is no match between the current image and the reference image.

Processing may continue at operation 604, where a noise stream may be attenuated or reduced to zero. For example, for pixels or regions of high motion, a generated noise stream or equalized noise stream may be minimally applied or not applied at all such that a smoother image and less noise may be provided for such pixels or regions of high motion.

Returning to decision operation 602, if the amount of local motion is less than the threshold (or equal to the threshold in some examples), processing may continue at operation 605, where a reference image (e.g., prior temporal noise reduced image) may be weighted more heavily in the pixel blending. For example, for pixels or regions of no motion (e.g., static regions), temporal noise reduction across images may provide higher quality imaging than the image currently being processed.

Processing may continue at operation 606, where a noise stream may be fully applied or attenuated only slightly for pixel blending. For example, for pixels or regions of no motion (e.g., static regions), a generated noise stream or equalized noise stream may be maximally applied or such that more detail may be provided (e.g., in such contexts, noise may provide detail or may be perceived as detail by a human viewer) for such pixels or regions of little or no motion.

Processing may continue from operation 604 or operation 606 at operation 607, where pixel blending may be performed based on the parameters determined at operations 603, 604 or operations 605, 606 as discussed as well as other pixel blending parameters to generate output pixels or regions. For example, pixel blending may be performed based on one or more of a reference image (e.g., reference image 112), an input image (e.g., input image 143), a noise reduced image (e.g., noise reduced image 117), and a noise stream (e.g., noise stream 142 or equalized noise stream 148) responsive, in part, to motion information (e.g., motion information 146) to generate output pixels (e.g., of output image 113). Such pixel blending may be based on weighting factors applied to each image and the noise stream with those factors determined or adjusted using the techniques discussed with respect to decision operation 602 and operations 603-606 and other factors or parameters.

Processing may continue at decision operation 608, where a determination may be made as to whether the current pixel or region is the last pixel or region to be processed. If not, processing may continue at operation 601 as discussed above. If so, processing may continue at end operation 609, where the output pixels may be provided as an output image and processing may end.

Returning to FIG. 1, as shown, output image 113 may be provided by pixel blending 135 for use as a reference image for a subsequent raw input image (if any). Furthermore, output image 113 may be provided to another module of system 100, to a memory of system 100, to a display of system 100, or the like. For example, output image 113 may be used by other modules for further processing, saved to memory for use by a user, displayed to a user, or the like. Output image 113 may include any suitable data or data format and may be characterized as an output image, an output video frame, a temporal noise reduced output image or video frame, or the like.

As discussed, a noise stream may be leveraged in temporal noise reduction to provide lower noise for moving and/or occluded regions. Using such techniques, strong application of spatial noise reduction may be avoided in such regions, which may maintain detail in such regions. Furthermore, higher detail preservation and higher contrast may be provided by adding back the noise stream (e.g., very high frequency signals) to static regions. Such techniques may provide detail recovery in such regions. Furthermore, by streaming noise (e.g., a difference signal between an input and output of a spatial noise reduction component placed before the temporal noise reduction component), the spatial noise reduction before temporal noise reduction may provide more smoothing, advantageously providing less noise to the temporal noise reduction such that the temporal noise reduction may provide more robust processing.

Figure 7:
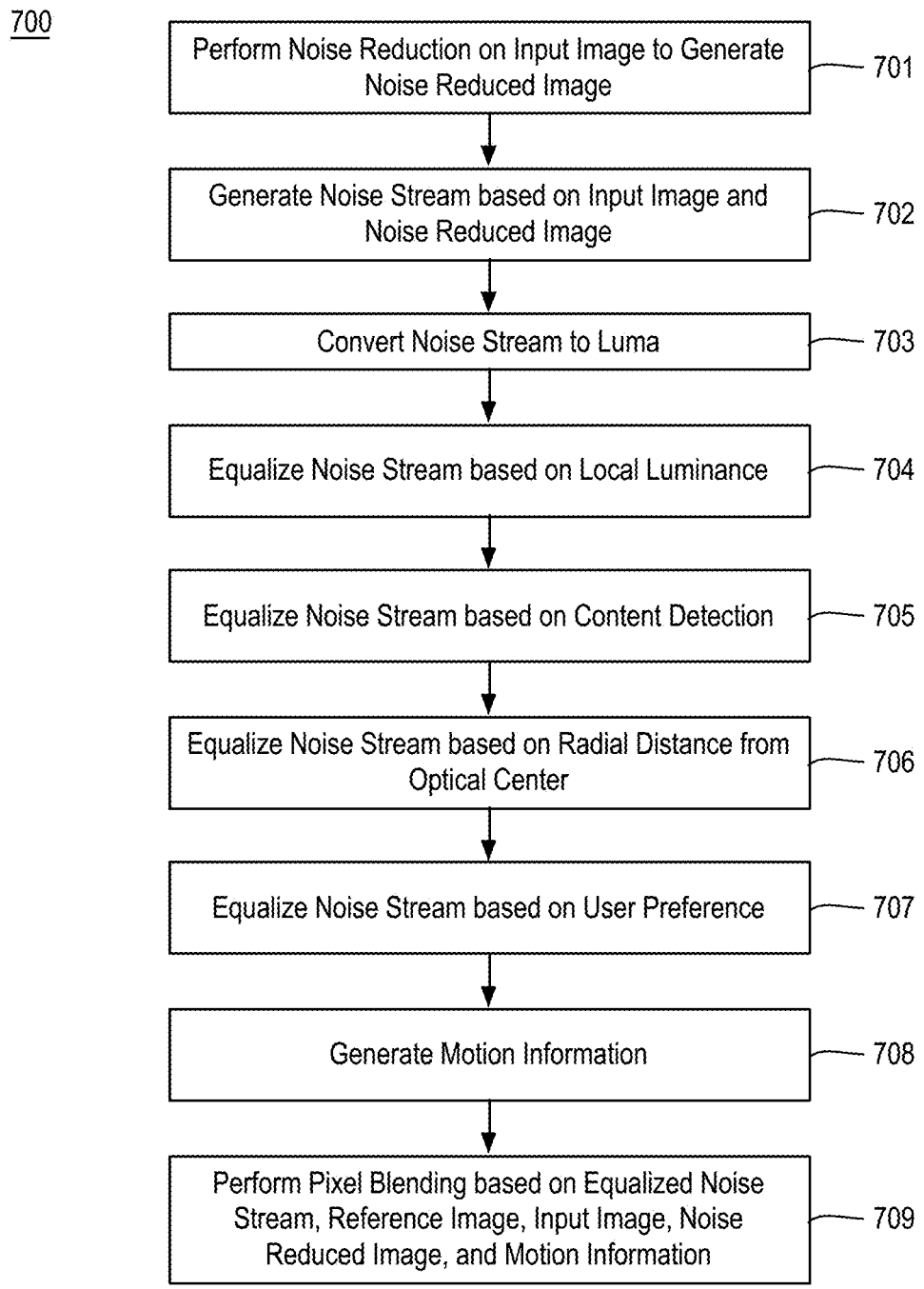
FIG. 7 illustrates an example process for providing temporal noise reduction.

FIG. 7 illustrates an example process 700 for providing temporal noise reduction, arranged in accordance with at least some implementations of the present disclosure. Process 700 may include one or more operations 701-709 as illustrated in FIG. 7. Process 700 may be performed by a system (e.g., system 100 or any other devices or systems discussed herein) or portions of process 700 may be performed by a system to provide temporal noise reduction. Process 700 or portions thereof may be repeated for any number input images, frames of video, or the like. For example, process 700 may provide a temporal noise reduced output image.

As shown, process 700 may begin at operation 701, where noise reduction may be performed on an input image such as a raw image to generate a noise reduced image. The input image may be from an image sensor and in a color filter array domain (e.g., not demosaiced) or the input image may be in any suitable domain such as an RGB domain, a YUV domain, or the like.

Processing may continue at operation 702, where a noise stream may be generated based on the input image and the noise reduced image. The noise stream may be generated using any suitable technique or techniques. In an embodiment, the noise stream may be generated by differencing the noise reduced image from the input image. For example, the noise stream may be in a color filter array domain or any suitable domain such as an RGB domain, a YUV domain, or the like based on the domain of the input image. The noise stream may include any suitable data or data structure such as a noise value for all or some pixels of the input image. The noise stream may correspond to a luma channel and/or one or more chroma channels.

Processing may continue at operation 703, where the noise stream may be converted to the luma domain to generate a luma noise stream or the like. The conversion of the noise stream to the luma domain may include converting from the color filter array domain, RGB domain, or YUV domain or the like. Such conversion may include removing color channel dependencies in the noise stream as discussed with respect to FIG. 4 and elsewhere herein. As discussed, in some examples, the noise stream may be implemented in one or more chroma channels or domains. In such examples, operation 703 may be skipped.

Processing may continue at operation 704, where the noise stream may be equalized or adjusted based on local luminance of an input image. The noise stream may be equalized or adjusted based on local luminance using any suitable technique or techniques. In an embodiment, local luminance of an input image (e.g., the input image of operation 701 or the noise reduced image generated at operation 701) may be generated based on local averaging of luminance values around pixel locations of the input image. Any window size may be used for such averaging such as a 2×2 pixel window or the like. Based on the local luminance map (e.g., luminance values for each pixel location), a local luminance mapping may be applied to generate a local luminance gain value for each pixel location. The local luminance mapping may provide for higher gain values for higher luminance areas (e.g., lower values) and lower gain values for lower luminance areas (e.g., higher values) as discussed herein. The noise stream may be equalized or adjusted based on the gain values by multiplying the noise stream value for a pixel location and the gain value for a pixel location to generate a noise stream equalized or adjusted based on local luminance. As discussed, in some examples, the noise stream may, in addition or in the alternative to being provided in a luma domain, be implemented in one or more chroma channels or domains. In such examples, operation 704 may be skipped or an additional operation may be provided to equalize or adjust the noise stream based on local chrominance as discussed herein.

Processing may continue at operation 705, where the noise stream may be equalized or adjusted based on content of an input image. The noise stream may be equalized or adjusted based on content detection of the input image using any suitable technique or techniques. In an embodiment, content levels of an input image (e.g., the input image of operation 701 or the noise reduced image generated at operation 701) may be generated based on content detection performed on the input image. Any suitable content detection techniques such as edge detection, texture detection, or the like may be used. Based on the content level map (e.g., content level values for each pixel location), a content level mapping may be applied to generate a content level gain value for each pixel location. The content level mapping may provide for higher gain values for higher content level values and lower gain values for lower content level values as discussed herein. The noise stream may be equalized or adjusted based on the gain values by multiplying the noise stream value for a pixel location and the gain value for a pixel location to generate a noise stream equalized or adjusted based on local luminance.

Processing may continue at operation 706, where the noise stream may be equalized or adjusted based on radial distances from an optical center of an input image. The noise stream may be equalized or adjusted based on radial distances from an optical center of the input image using any suitable technique or techniques. In an embodiment, radial distances of an input image (e.g., the input image of operation 701 or the noise reduced image generated at operation 701) may be generated using any suitable technique or techniques. In an embodiment, the radial distances from an optical center may be known or saved before the input image is generated. Based on the radial distances map (e.g., radial distances values for each pixel location), a radial distances mapping may be applied to generate a radial distances gain value for each pixel location. The radial distances mapping may provide for higher gain values for lower radial distance values and lower gain values for higher radial distance values as discussed herein. The noise stream may be equalized or adjusted based on the gain values by multiplying the noise stream value for a pixel location and the gain value for a pixel location to generate a noise stream equalized or adjusted based on local luminance.

Processing may continue at operation 707, where the noise stream may be equalized or adjusted based on user preference. For example, a user or developer or the like may adjust the gain of the noise stream based on a user preference mapping, a gain value applied to the entire noise stream, or the like. Although illustrated with noise stream equalization or adjustment based on local luminance, content detection, radial distance from optical center, and user preference, process 700 may skip one or more of such noise stream equalizations or adjustments. Such noise stream equalization or adjustment may generate an equalized noise stream as discussed herein.

Processing may continue at operation 708, where motion information may be generated based on an input image and a reference image (e.g., a previously processed image). The motion information may be generated using any suitable technique or techniques. In an embodiment, local motion estimation may be performed based on an input image (e.g., the input image of operation 701 or the noise reduced image generated at operation 701) and a reference image and the resultant motion vector field may be analyzed for broken trajectories. Such broken trajectories may be indicated in the motion information using a value dedicated to motion outside of the range of the motion search and broken trajectories and the like. In other examples, local motion estimation may not be provided and motion confidence values may be determined representative of whether motion is detected. For example, motion confidence values may be generated based on comparing an input image to a reference image such that those areas that match are provided low motion values or motion confidence values and those areas that do not match are provided high motion values or motion confidence values. The resultant motion information may include motion vectors, indicators of local motion, motion values, motion confidence values, or the like.

Processing may continue at operation 709, where pixel blending may be performed based on the equalized noise stream, the reference image, the input image, and the noise reduced image based on the motion information generated at operation 708. The pixel blending may be performed using any suitable technique or techniques. As discussed, the pixel blending may include fully applying the equalized noise stream to image regions corresponding to little or no motion and attenuating or not applying the equalized noise stream to image regions corresponding to fast motion or occluded regions as indicated by the motion information.

Process 700 may be repeated any number of times either in series or in parallel for any number of images, video frames, or the like. As discussed, process 700 may provide for temporal noise reduction of the images, video frames, or the like.

Figure 8:
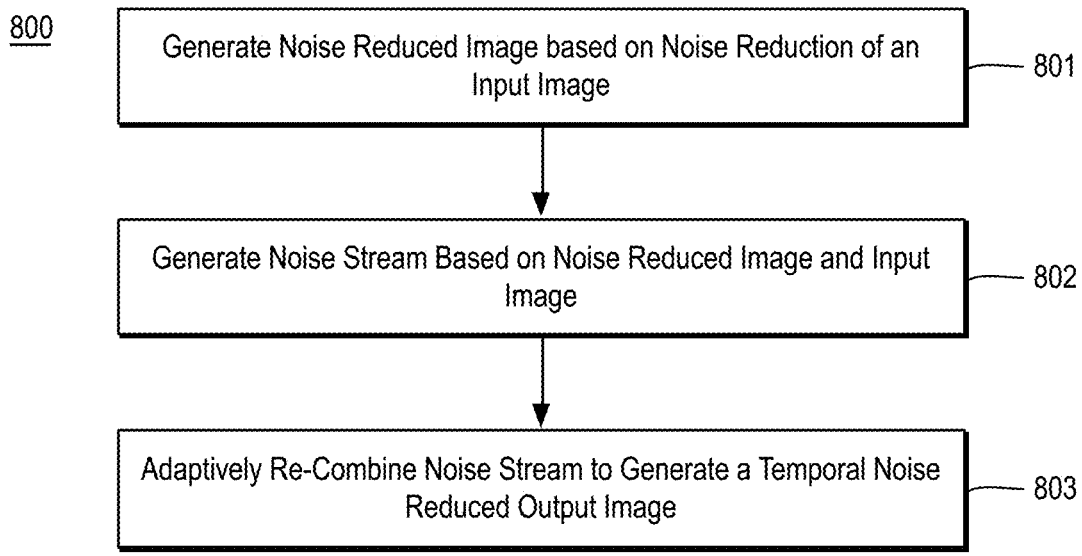
FIG. 8 is a flow diagram illustrating an example process for providing temporal noise reduction.

FIG. 8 is a flow diagram illustrating an example process 800 for providing temporal noise reduction, arranged in accordance with at least some implementations of the present disclosure. Process 800 may include one or more operations 801-803 as illustrated in FIG. 8. Process 800 may form at least part of a temporal noise reduction process. By way of non-limiting example, process 800 may form at least part of a temporal noise reduction as performed by system 100 as discussed herein. Furthermore, process 800 will be described herein with reference to system 900 of FIG. 9.

Figure 9:
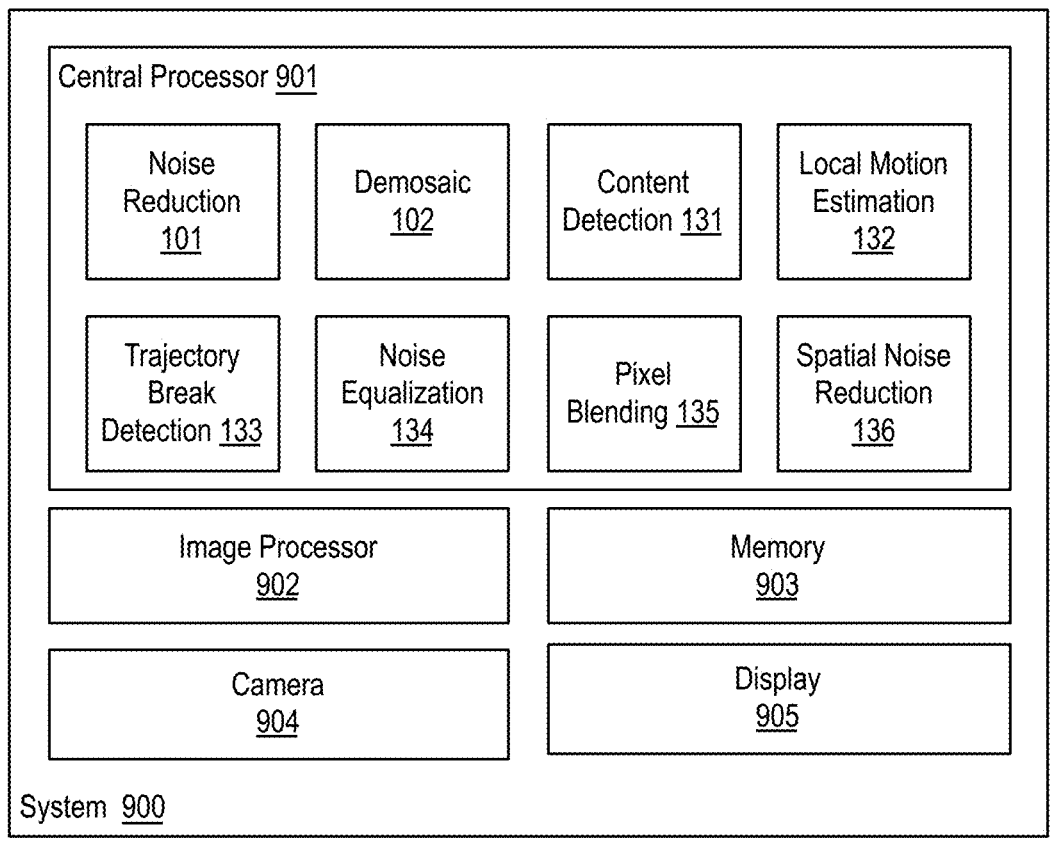
FIG. 9 is an illustrative diagram of an example system for providing temporal noise reduction.

FIG. 9 is an illustrative diagram of an example system 900 for providing temporal noise reduction, arranged in accordance with at least some implementations of the present disclosure. As shown in FIG. 9, system 900 may include a central processor 901, an image processor 902, a memory 903, a camera 904, and a display 905. As discussed, in some embodiments system 900 may not include camera 904 and/or display 905. Also as shown, central processor 901 may include or implement noise reduction module 101, demosaic module 102, content detection module 131, local motion estimation module 132, trajectory break module 133, noise equalization module 134, pixel blending module 135, and spatial noise reduction module 136. In an embodiment, content detection module 131, local motion estimation module 132, trajectory break module 133, noise equalization module 134, pixel blending module 135, and spatial noise reduction module 136 may be implemented by a temporal noise reduction module or component. In an embodiment, demosaic module 102 may not be implemented. In such examples, image processor 902 may provide a demosaiced image (e.g., in YUV, RGB or any other suitable color space) to noise reduction module 101, content detection module 131, local motion estimation module 132, trajectory break detection module 133, noise equalization module 134, pixel blending module 135, and/or spatial noise reduction module 136. In an embodiment, content detection module 131, local motion estimation module 132, trajectory break detection module 133, noise equalization module 134, pixel blending module 135, and/or spatial noise reduction module 136 may be characterized as a temporal noise reduction module or component or the like. In an embodiment, the temporal noise reduction module or component may be provided as post processing with respect to an image processor or image processing pipeline. In the example of system 900, memory 903 may store image data, video frame data, noise reduction image data, reference image data, detail level data, content level data, local motion data, motion information data, noise stream data, equalized noise stream data, parameters, thresholds, or any other data discussed herein.

As shown, in some examples, noise reduction module 101, demosaic module 102, content detection module 131, local motion estimation module 132, trajectory break module 133, noise equalization module 134, pixel blending module 135, and spatial noise reduction module 136 may be implemented via central processor 901. In other examples, one or more or portions of noise reduction module 101, demosaic module 102, content detection module 131, local motion estimation module 132, trajectory break module 133, noise equalization module 134, pixel blending module 135, and spatial noise reduction module 136 may be implemented via image processor 902, an image processing unit, an image processing pipeline, or the like. In some examples, noise reduction module 101, demosaic module 102, content detection module 131, local motion estimation module 132, trajectory break module 133, noise equalization module 134, pixel blending module 135, and spatial noise reduction module 136 may be implemented in hardware as a system-on-a-chip (SoC).

Image processor 902 may include any number and type of image or graphics processing units that may provide the operations as discussed herein. Such operations may be implemented via software or hardware or a combination thereof. For example, image processor 902 may include circuitry dedicated to manipulate and/or analyze images obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory. In an embodiment, one or more or portions of noise reduction module 101, demosaic module 102, content detection module 131, local motion estimation module 132, trajectory break module 133, noise equalization module 134, pixel blending module 135, and spatial noise reduction module 136 may be implemented via an execution unit (EU) of image processor 902. The EU may include, for example, programmable logic or circuitry such as a logic core or cores that may provide a wide array of programmable logic functions. In an embodiment, one or more or portions of noise reduction module 101, demosaic module 102, content detection module 131, local motion estimation module 132, trajectory break module 133, noise equalization module 134, pixel blending module 135, and spatial noise reduction module 136 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 may begin at operation 801, where a noise reduced image may be generated based on a noise reduction of an input image. The noise reduced image may be generated using any suitable technique or techniques. In an embodiment, noise reduction module 101 as implemented via central processor 901 may generate the noise reduced image based on spatial noise reduction of the input image. The input image may be any suitable image in any suitable color space. In an embodiment, the input image may be a demosaiced input image. In an embodiment, the input image may be in a color filter array domain. In such an embodiment, the noise reduced image may be demosaiced to generate an input image for temporal noise reduction processing.

Processing may continue at operation 802, where a noise stream corresponding to the input image may be generated based on noise reduced image and the noise reduced image. The noise stream may be generated using any suitable technique or techniques. In an embodiment, a differencer as implemented via central processor 901 may generate the noise stream as a difference between the noise reduced image and the noise reduced image. The noise stream may be in any suitable color space. In an embodiment, the noise stream may include a luma and chroma components. In an embodiment, the noise stream may include color channels. In an embodiment, the noise stream may be in a color filter array domain.

Processing may continue at operation 803, where at least a portion of the noise stream may be adaptively combined with a reference image corresponding to the input image and a second noise reduced image corresponding to the input image to generate a temporal noise reduced output image. The noise stream may be adaptively combined with the images using any suitable technique or techniques. In an embodiment, noise equalization module 134 and/or pixel blending module 135 as implemented via central processor 901 may adaptively combine the noise stream with the images. In an embodiment, the noise reduced image generated at operation 801 may be the second noise reduced image. In an embodiment, the noise reduced image generated at operation 801 may undergo further spatial reduction to generate the second noise reduced image. For example, spatial noise reduction module 136 as implemented via central processor 901 may generate the second noise reduced image based on the noise reduced image. The reference image may be generated using any suitable technique or techniques. In an embodiment, the reference image may be a prior processed (e.g., prior temporal noise reduced output image generated via process 800).

As discussed, the noise stream may be adaptively combined with a reference image and a noise reduced image using any suitable technique or techniques such as pixel blending techniques. In an embodiment, the noise stream may be adaptively combined with the reference image, the noise reduced image generated at operation 801, and the second noise reduced image based on motion information corresponding to the input image. For example, adaptively combining the portion of the noise stream may include applying the noise stream based on motion information corresponding to the input image. In an embodiment, the motion information may include a first location having a first motion value and a second location having a second motion value greater than the first motion value and applying the noise stream may include applying the noise stream at a greater level at the first location than the second location. In an embodiment, the local motion value information may include a first location having a first motion value less than a threshold and a second location having a second motion value greater than the threshold and applying the noise stream may include applying the noise stream at the first location and not applying the noise stream at the second location.

In an embodiment, adaptively combining the portion of the noise stream may include adjusting the noise stream based on one or more of local luminance corresponding to the input image, detected content corresponding to the input image, or a radial distance from an optical center of the input image.

In an embodiment, adaptively combining the portion of the noise stream may include adjusting the noise stream based on a local luminance map corresponding to the input image by applying a local luminance dependent gain to the noise stream. For example, the noise stream may be attenuated for areas of low luminance (e.g., dark areas) and not attenuated for areas of high luminance (e.g., bright areas). For example, the local luminance map may have a first local luminance value at a first location and a second local luminance value less than the first local luminance value at a second location and the local luminance dependent gain may provide a first local luminance gain value for the first location and a second local luminance gain value greater than the first local luminance gain value for the second location responsive to the local luminance map.

In an embodiment, adaptively combining the portion of the noise stream may include adjusting the noise stream based on a local chrominance map corresponding to the input image by applying a local chrominance dependent gain to the noise stream. For example, the noise stream may be attenuated for areas of low chrominance and not attenuated for areas of high chrominance. For example, the local chrominance map may have a first local chrominance value at a first location and a second local chrominance value less than the first local chrominance value at a second location and the local chrominance dependent gain may provide a first local chrominance gain value for the first location and a second local chrominance gain value greater than the first local chrominance gain value for the second location responsive to the local chrominance map.

In an embodiment, adaptively combining the portion of the noise stream may include adjusting the noise stream based on a content level map corresponding to the input image by applying a content level dependent gain to the noise stream. For example, the content level map may have a first content detection value at a first location and a second content detection value less than the first content detection value at a second location and the content level dependent gain may provide a first content level gain value for the first location and a second content level gain value less than the first level dependent gain value for the second location responsive to the content level map.

In an embodiment, adaptively combining the portion of the noise stream may include adjusting the noise stream based on a radial distance from an optical center by applying a radial distance dependent gain to the noise stream. For example, a first radial distance adaptive gain value for a first location may be less than a second radial distance adaptive gain value for a second location responsive to the first location being a greater distance from the optical center than the second location.

As discussed, the noise stream may be adjusted or equalized prior to or as a part o adaptively combining the noise stream with the discussed images. In an embodiment, the noise stream may be converted to a luma noise stream prior to such adjusting, equalizing, or adaptively combining the noise stream with the images.

Furthermore, as discussed, process 800 may include adaptively combining the noise stream with the reference image and the second noise reduced image comprises pixel blending the noise stream, the reference image, the second noise reduced image, and the noise reduced image based on motion information corresponding to the input image. In an embodiment, content detection may be performed based on the noise reduced image to generate a content level map, local motion estimation may be performed based on the noise reduced image and the reference image to generate a local motion map, trajectory break detection may be performed on the local motion map to generate a local motion confidence map, a local luminance map may be generated based on the noise reduced image, and the noise stream may be adjusted based on the content level map and the local luminance map. For example, adaptively combining the portion of the noise stream may include applying the noise stream based on the final local motion map and the local motion confidence map.

Process 800 may be repeated any number of times either in series or in parallel for any number of images, video frames, or the like. As discussed, process 800 may provide for temporal noise reduction of the images, video frames, or the like.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
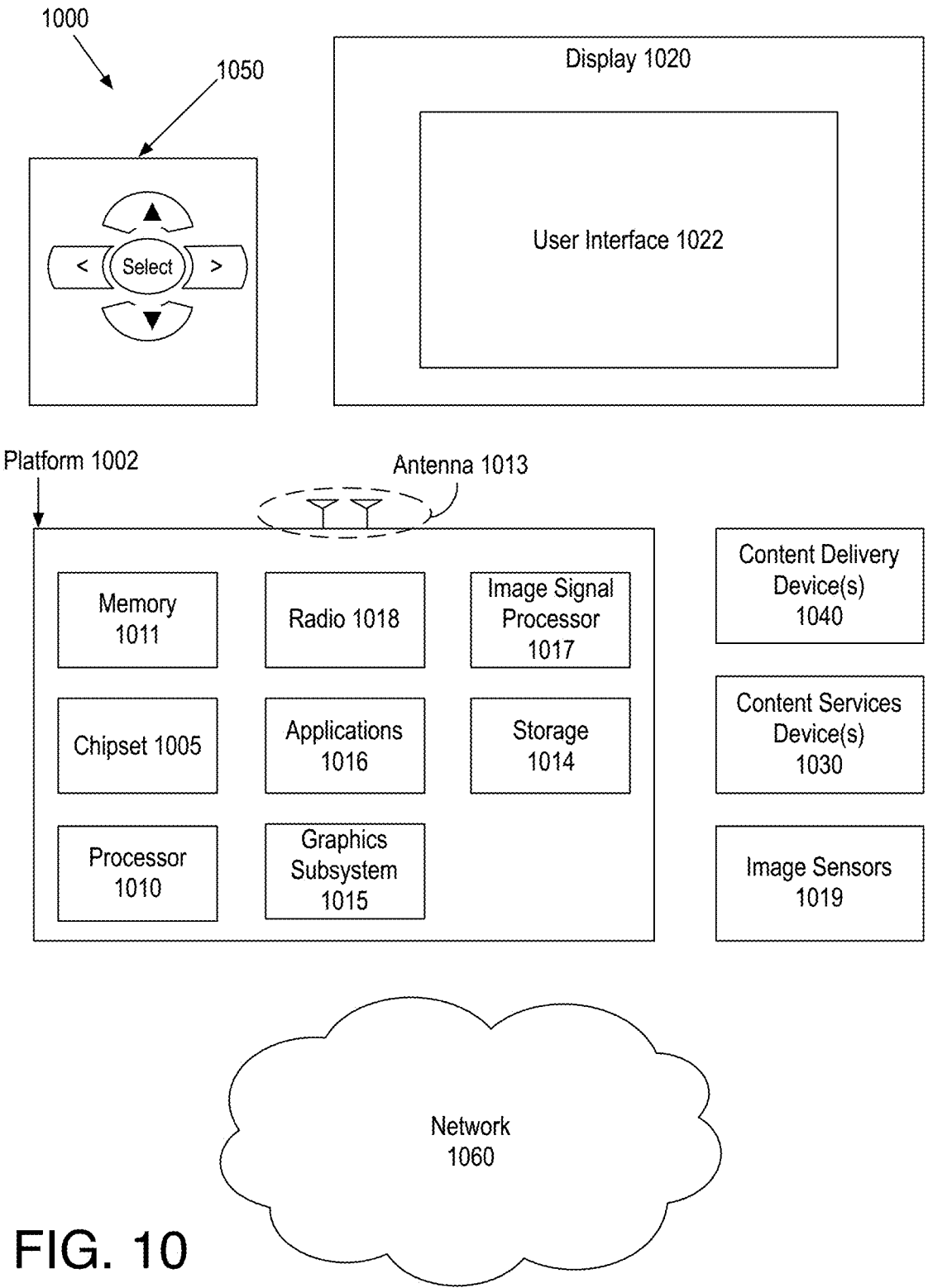
FIG. 10 is an illustrative diagram of an example system.

FIG. 10 is an illustrative diagram of an example system 1000, arranged in accordance with at least some implementations of the present disclosure. In various implementations, system 1000 may be a mobile device system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1000 includes a platform 1002 coupled to a display 1020. Platform 1002 may receive content from a content device such as content services device(s) 1030 or content delivery device(s) 1040 or other content sources such as image sensors 1019. For example, platform 1002 may receive image data as discussed herein from image sensors 1019 or any other content source. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1011, antenna 1013, storage 1014, graphics subsystem 1015, applications 1016, image signal processor 1017 and/or radio 1018. Chipset 1005 may provide intercommunication among processor 1010, memory 1011, storage 1014, graphics subsystem 1015, applications 1016, image signal processor 1017 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1011 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

Image sensors 1019 may include any suitable image sensors that may provide image data based on a scene. For example, image sensors 1019 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1019 may include any device that may detect information of a scene to generate image data.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
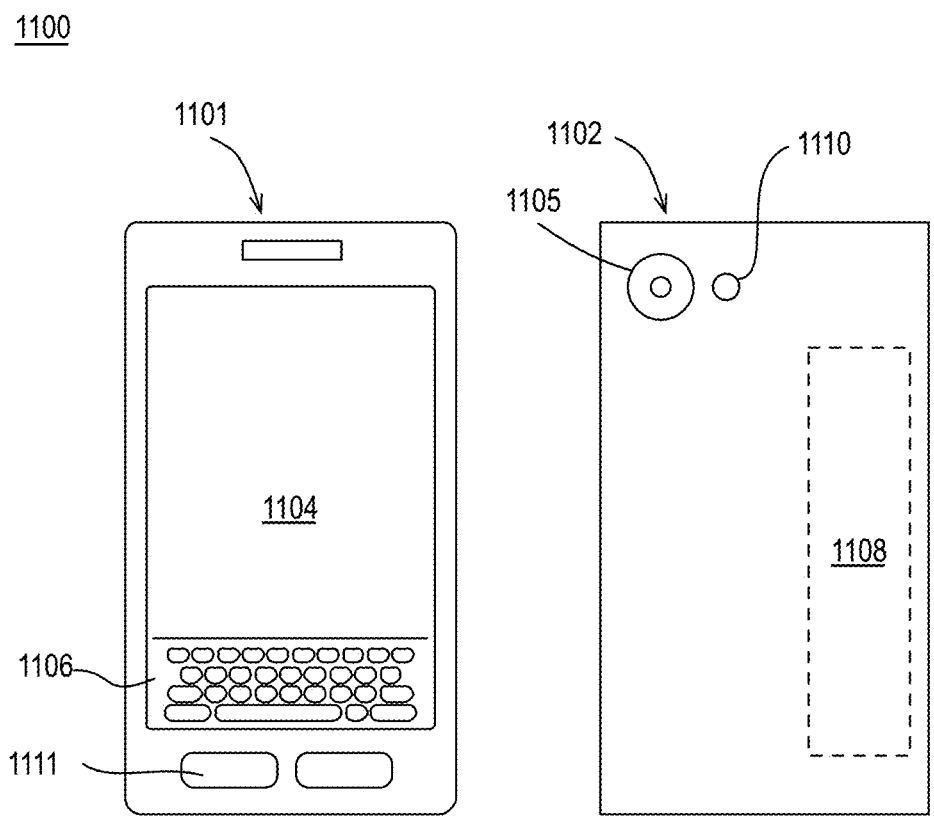
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, device 100 or portions thereof may be implemented via device 1100. In various embodiments, for example, device 1100 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1111. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and/or flash 1110 may be integrated into front 1101 of device 1100 and/or additional cameras (e.g., such that device 1100 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for providing temporal noise reduction comprises generating a noise reduced image based on a noise reduction of an input image, generating a noise stream corresponding to the input image based on the input image and the noise reduced image, and adaptively combining at least a portion of the noise stream with a reference image corresponding to the input image and a second noise reduced image corresponding to the input image to generate a temporal noise reduced output image.

Further to the first embodiments, adaptively combining the portion of the noise stream comprises applying the noise stream based on motion information corresponding to the input image.

Further to the first embodiments, adaptively combining the portion of the noise stream comprises applying the noise stream based on motion information corresponding to the input image, wherein the motion information comprises a first location having a first motion value and a second location having a second motion value greater than the first motion value, and wherein applying the noise stream comprises applying the noise stream at a greater level at the first location than the second location.

Further to the first embodiments, adaptively combining the portion of the noise stream comprises applying the noise stream based on motion information corresponding to the input image, wherein the motion information comprises a first location having a first motion value less than a threshold and a second location having a second motion value greater than the threshold, and wherein applying the noise stream comprises applying the noise stream at the first location and not applying the noise stream at the second location.

Further to the first embodiments, adaptively combining the noise stream with the reference image and the second noise reduced image comprises pixel blending the noise stream, the reference image, the second noise reduced image, and the noise reduced image based on motion information corresponding to the input image.

Further to the first embodiments, adaptively combining the portion of the noise stream comprises adjusting the noise stream based on at least one of local luminance corresponding to the input image, local chrominance corresponding to the input image, detected content corresponding to the input image, or a radial distance from an optical center of the input image.

Further to the first embodiments, adaptively combining the portion of the noise stream comprises adjusting the noise stream based on a local luminance map corresponding to the input image by applying a local luminance dependent gain to the noise stream, wherein the local luminance map has a first local luminance value at a first location and a second local luminance value less than the first local luminance value at a second location, and wherein the local luminance dependent gain provides a first local luminance gain value for the first location and a second local luminance gain value greater than the first local luminance gain value for the second location responsive to the local luminance map.

Further to the first embodiments, adaptively combining the portion of the noise stream comprises adjusting the noise stream based on a content level map corresponding to the input image by applying a content level dependent gain to the noise stream, wherein the content level map has a first content detection value at a first location and a second content detection value less than the first content detection value at a second location, and wherein the content level dependent gain provides a first content level gain value for the first location and a second content level gain value less than the first level dependent gain value for the second location responsive to the content level map.

Further to the first embodiments, adaptively combining the portion of the noise stream comprises adjusting the noise stream based on a radial distance from an optical center by applying a radial distance dependent gain to the noise stream, wherein a first radial distance adaptive gain value for a first location is less than a second radial distance adaptive gain value for a second location responsive to the first location being a greater distance from the optical center than the second location.

Further to the first embodiments, the input image and the noise stream are in a color filter array domain and the method further comprises demosaicing the noise reduced image to generate a demosaiced image, applying spatial noise reduction to the demosaiced image to generate the second noise reduced image, and converting the noise stream to a luma noise stream prior to adaptively combining the noise stream with the reference image and the second noise reduced image.

Further to the first embodiments, the input image comprises a demosaiced input image and the method further comprises applying a second spatial noise reduction to the input image to generate the second noise reduced image.

Further to the first embodiments, the method further comprises performing content detection based on the noise reduced image to generate a content level map, performing local motion estimation based on the noise reduced image and the reference image to generate a local motion map, performing trajectory break detection on the local motion map to generate a local motion confidence map, generating a local luminance map based on the noise reduced image, and adjusting the noise stream based on the content level map and the local luminance map, wherein adaptively combining the portion of the noise stream comprises applying the noise stream based on the local motion map and the local motion confidence map.

In one or more second embodiments, a system for providing provide temporal noise reduction comprises a memory configured to store an input image and an image processor coupled to the memory, the image processor to generate a noise reduced image based on a noise reduction of the input image, to generate a noise stream corresponding to the input image based on the input image and the noise reduced image, and to adaptively combine at least a portion of the noise stream with a reference image corresponding to the input image and a second noise reduced image corresponding to the input image to generate a temporal noise reduced output image.

Further to the second embodiments, the image processor to adaptively combine the portion of the noise stream comprises the image processor to apply the noise stream based on motion information corresponding to the input image.

Further to the second embodiments, the image processor to adaptively combine the portion of the noise stream comprises the image processor to apply the noise stream based on motion information corresponding to the input image, wherein the motion information comprises a first location having a first motion value and a second location having a second motion value greater than the first motion value, and wherein the image processor to apply the noise stream comprises the image processor to apply the noise stream at a greater level at the first location than the second location.

Further to the second embodiments, the image processor to adaptively combine the portion of the noise stream comprises the image processor to apply the noise stream based on motion information corresponding to the input image, wherein the motion information comprises a first location having a first motion value less than a threshold and a second location having a second motion value greater than the threshold, and wherein the image processor to apply the noise stream comprises the image processor to apply the noise stream at the first location and to not apply the noise stream at the second location.

Further to the second embodiments, the image processor to adaptively combine the portion of the noise stream comprises the image processor to apply the noise stream based on motion information corresponding to the input image, wherein the motion information comprises a first location having a first motion value and a second location having a second motion value greater than the first motion value and the image processor to apply the noise stream comprises the image processor to apply the noise stream at a greater level at the first location than the second location and/or wherein the motion information comprises a first location having a first motion value less than a threshold and a second location having a second motion value greater than the threshold and the image processor to apply the noise stream comprises the image processor to apply the noise stream at the first location and to not apply the noise stream at the second location.

Further to the second embodiments, the image processor to adaptively combine the noise stream with the reference image and the second noise reduced image comprises the image processor to pixel blend the noise stream, the reference image, the second noise reduced image, and the noise reduced image based on motion information corresponding to the input image.

Further to the second embodiments, the image processor to adaptively combine the portion of the noise stream comprises the image processor to adjust the noise stream based on at least one of local luminance corresponding to the input image, local chrominance corresponding to the input image, detected content corresponding to the input image, or a radial distance from an optical center of the input image.

Further to the second embodiments, the image processor to adaptively combine the portion of the noise stream comprises the image processor to adjust the noise stream based on a local luminance map corresponding to the input image by applying a local luminance dependent gain to the noise stream, wherein the local luminance map has a first local luminance value at a first location and a second local luminance value less than the first local luminance value at a second location, and wherein the local luminance dependent gain provides a first local luminance gain value for the first location and a second local luminance gain value greater than the first local luminance gain value for the second location responsive to the local luminance map.

Further to the second embodiments, the image processor to adaptively combine the portion of the noise stream comprises the image processor to adjust the noise stream based on a content level map corresponding to the input image by applying a content level dependent gain to the noise stream, wherein the content level map has a first content detection value at a first location and a second content detection value less than the first content detection value at a second location, and wherein the content level dependent gain provides a first content level gain value for the first location and a second content level gain value less than the first level dependent gain value for the second location responsive to the content level map.

Further to the second embodiments, the image processor to adaptively combine the portion of the noise stream comprises the image processor to adjust the noise stream based on a radial distance from an optical center by applying a radial distance dependent gain to the noise stream, wherein a first radial distance adaptive gain value for a first location is less than a second radial distance adaptive gain value for a second location responsive to the first location being a greater distance from the optical center than the second location.

Further to the second embodiments, the input image and the noise stream are in a color filter array domain and the image processor is further to demosaic the noise reduced image to generate a demosaiced image, to apply spatial noise reduction to the demosaiced image to generate the second noise reduced image, and to convert the noise stream to a luma noise stream prior to adaptively combining the noise stream with the reference image and the second noise reduced image.

Further to the second embodiments, the input image comprises a demosaiced input image and the image processor is further to apply a second spatial noise reduction to the input image to generate the second noise reduced image.

In one or more third embodiments, a system comprises means for generating a noise reduced image based on a noise reduction of an input image, means for generating a noise stream corresponding to the input image based on the input image and the noise reduced image, and means for adaptively combining at least a portion of the noise stream with a reference image corresponding to the input image and a second noise reduced image corresponding to the input image to generate a temporal noise reduced output image.

Further to the third embodiments, the means for adaptively combining the portion of the noise stream comprise means for applying the noise stream based on motion information corresponding to the input image.

Further to the third embodiments, the means for adaptively combining the portion of the noise stream comprise means for applying the noise stream based on motion information corresponding to the input image, wherein the motion information comprises a first location having a first motion value and a second location having a second motion value greater than the first motion value, and wherein the means for applying the noise stream comprise means for applying the noise stream at a greater level at the first location than the second location.

Further to the third embodiments, the means for adaptively combining the portion of the noise stream comprise means for applying the noise stream based on motion information corresponding to the input image, wherein the motion information comprises a first location having a first motion value less than a threshold and a second location having a second motion value greater than the threshold, and wherein the means for applying the noise stream comprise means for applying the noise stream at the first location and not applying the noise stream at the second location.

Further to the third embodiments, the means for adaptively combining the portion of the noise stream comprise means for adjusting the noise stream based on a local luminance map corresponding to the input image by applying a local luminance dependent gain to the noise stream, wherein the local luminance map has a first local luminance value at a first location and a second local luminance value less than the first local luminance value at a second location, and wherein the local luminance dependent gain provides a first local luminance gain value for the first location and a second local luminance gain value greater than the first local luminance gain value for the second location responsive to the local luminance map.

Further to the third embodiments, the means for adaptively combining the portion of the noise stream comprise means for adjusting the noise stream based on a content level map corresponding to the input image by applying a content level dependent gain to the noise stream, wherein the content level map has a first content detection value at a first location and a second content detection value less than the first content detection value at a second location, and wherein the content level dependent gain provides a first content level gain value for the first location and a second content level gain value less than the first level dependent gain value for the second location responsive to the content level map.

Further to the third embodiments, the means for adaptively combining the portion of the noise stream comprises means for adjusting the noise stream based on a radial distance from an optical center by applying a radial distance dependent gain to the noise stream, wherein a first radial distance adaptive gain value for a first location is less than a second radial distance adaptive gain value for a second location responsive to the first location being a greater distance from the optical center than the second location.

In one or more fourth embodiments, at least one machine readable medium comprises a plurality of instructions that, in response to being executed on a device, cause the device to provide temporal noise reduction by generating a noise reduced image based on a noise reduction of an input image, generating a noise stream corresponding to the input image based on the input image and the noise reduced image, and adaptively combining at least a portion of the noise stream with a reference image corresponding to the input image and a second noise reduced image corresponding to the input image to generate a temporal noise reduced output image.

Further to the fourth embodiments, adaptively combining the portion of the noise stream comprises applying the noise stream based on motion information corresponding to the input image.

Further to the fourth embodiments, adaptively combining the portion of the noise stream comprises adjusting the noise stream based on a local luminance map corresponding to the input image by applying a local luminance dependent gain to the noise stream, wherein the local luminance map has a first local luminance value at a first location and a second local luminance value less than the first local luminance value at a second location, and wherein the local luminance dependent gain provides a first local luminance gain value for the first location and a second local luminance gain value greater than the first local luminance gain value for the second location responsive to the local luminance map.

Further to the fourth embodiments, adaptively combining the portion of the noise stream comprises adjusting the noise stream based on a content level map corresponding to the input image by applying a content level dependent gain to the noise stream, wherein the content level map has a first content detection value at a first location and a second content detection value less than the first content detection value at a second location, and wherein the content level dependent gain provides a first content level gain value for the first location and a second content level gain value less than the first level dependent gain value for the second location responsive to the content level map.

Further to the fourth embodiments, adaptively combining the portion of the noise stream comprises adjusting the noise stream based on a radial distance from an optical center by applying a radial distance dependent gain to the noise stream, wherein a first radial distance adaptive gain value for a first location is less than a second radial distance adaptive gain value for a second location responsive to the first location being a greater distance from the optical center than the second location.

Further to the fourth embodiments, the machine readable medium comprises further instructions that, in response to being executed on the device, cause the device to provide temporal noise reduction by performing content detection based on the noise reduced image to generate a content level map, performing local motion estimation based on the noise reduced image and the reference image to generate a local motion map, performing trajectory break detection on the local motion map to generate a final local motion map, generating a local luminance map based on the noise reduced image, and adjusting the noise stream based on the content level map and the local luminance map, wherein adaptively combining the portion of the noise stream comprises applying the noise stream based on the final local motion map.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for providing temporal noise reduction comprising:
generating a noise reduced image based on a noise reduction of an input image, a noise stream corresponding to the input image based on the input image and the noise reduced image, a content level map based on content detection performed using the noise reduced image, a local motion map based on local motion estimation performed using the noise reduced image and a reference image corresponding to the input image, and a local luminance map based on the noise reduced image;
performing trajectory break detection on the local motion map to generate a final local motion map;
adjusting the noise stream based on the content level map and the local luminance map; and
adaptively combining at least a portion of the noise stream with the reference image and a second noise reduced image corresponding to the input image to generate a temporal noise reduced output image, wherein adaptively combining the portion of the noise stream comprises applying the noise stream based on the final local motion map.

2. The method of claim 1, wherein the final local motion map comprises a first location having a first motion value and a second location having a second motion value greater than the first motion value, and wherein applying the noise stream comprises applying the noise stream at a greater level at the first location than the second location.

3. The method of claim 1, wherein the final local motion map comprises a first location having a first motion value less than a threshold and a second location having a second motion value greater than the threshold, and wherein applying the noise stream comprises applying the noise stream at the first location and not applying the noise stream at the second location.

4. The method of claim 1, wherein adaptively combining the portion of the noise stream with the reference image and the second noise reduced image comprises pixel blending the noise stream, the reference image, the second noise reduced image, and the noise reduced image based on the final local motion map corresponding to the input image.

5. The method of claim 1, wherein adjusting the noise stream is further based on local chrominance corresponding to the input image or a radial distance from an optical center of the input image.

6. The method of claim 1, wherein adjusting the noise stream comprises applying a local luminance dependent gain to the noise stream, wherein the local luminance map has a first local luminance value at a first location and a second local luminance value less than the first local luminance value at a second location, and wherein the local luminance dependent gain provides a first local luminance gain value for the first location and a second local luminance gain value greater than the first local luminance gain value for the second location responsive to the local luminance map.

7. The method of claim 1, wherein adjusting the noise stream comprises applying a content level dependent gain to the noise stream, wherein the content level map has a first content detection value at a first location and a second content detection value less than the first content detection value at a second location, and wherein the content level dependent gain provides a first content level gain value for the first location and a second content level gain value less than the first level dependent gain value for the second location responsive to the content level map.

8. The method of claim 1, wherein adjusting the noise stream is further based on a radial distance from an optical center by applying a radial distance dependent gain to the noise stream, wherein a first radial distance adaptive gain value for a first location is less than a second radial distance adaptive gain value for a second location responsive to the first location being a greater distance from the optical center than the second location.

9. The method of claim 1, wherein the input image and the noise stream are in a color filter array domain and the method further comprises:
demosaicing the noise reduced image to generate a demosaiced image;
applying spatial noise reduction to the demosaiced image to generate the second noise reduced image; and
converting the noise stream to a luma noise stream prior to adaptively combining the noise stream with the reference image and the second noise reduced image.

10. The method of claim 1, wherein the input image comprises a demosaiced input image and the method further comprises:
applying a second spatial noise reduction to the input image to generate the second noise reduced image.

11. A system for providing temporal noise reduction comprising:
a memory configured to store an input image; and
an image processor coupled to the memory, the image processor to:
generate a noise reduced image based on a noise reduction of the input image, a noise stream corresponding to the input image based on the input image and the noise reduced image, a content level map based on content detection performed using the noise reduced image, a local motion map based on local motion estimation performed using the noise reduced image and a reference image corresponding to the input image, and a local luminance map based on the noise reduced image;
perform trajectory break detection on the local motion map to generate a final local motion map;
adjust the noise stream based on the content level map and the local luminance map; and
adaptively combine at least a portion of the noise stream with the reference image corresponding to the input image and a second noise reduced image corresponding to the input image to generate a temporal noise reduced output image, wherein to adaptively combine the portion of the noise stream comprises the image processor to apply the noise stream based on the final local motion map.

12. The system of claim 11, wherein the final local motion map comprises a first location having a first motion value and a second location having a second motion value greater than the first motion value, and wherein the image processor to apply the noise stream comprises the image processor to apply the noise stream at a greater level at the first location than the second location.

13. The system of claim 11, wherein the final local motion map comprises a first location having a first motion value less than a threshold and a second location having a second motion value greater than the threshold, and wherein the image processor to apply the noise stream comprises the image processor to apply the noise stream at the first location and to not apply the noise stream at the second location.

14. The system of claim 11, wherein the image processor to adjust the noise stream comprises the image processor to apply a local luminance dependent gain to the noise stream, wherein the local luminance map has a first local luminance value at a first location and a second local luminance value less than the first local luminance value at a second location, and wherein the local luminance dependent gain provides a first local luminance gain value for the first location and a second local luminance gain value greater than the first local luminance gain value for the second location responsive to the local luminance map.

15. The system of claim 11, wherein the image processor to adjust the noise stream comprises the processor to apply a content level dependent gain to the noise stream, wherein the content level map has a first content detection value at a first location and a second content detection value less than the first content detection value at a second location, and wherein the content level dependent gain provides a first content level gain value for the first location and a second content level gain value less than the first level dependent gain value for the second location responsive to the content level map.

16. The system of claim 11, wherein the image processor is further to adjust the noise stream based on a radial distance from an optical center by application of a radial distance dependent gain to the noise stream, wherein a first radial distance adaptive gain value for a first location is less than a second radial distance adaptive gain value for a second location responsive to the first location being a greater distance from the optical center than the second location.

17. The system of claim 11, wherein the input image and the noise stream are in a color filter array domain and the image processor is further to:
demosaic the noise reduced image to generate a demosaiced image;
apply spatial noise reduction to the demosaiced image to generate the second noise reduced image; and
convert the noise stream to a luma noise stream prior to adaptively combining the noise stream with the reference image and the second noise reduced image.

18. The system of claim 11, wherein the input image comprises a demosaiced input image and the image processor is further to:
apply a second spatial noise reduction to the input image to generate the second noise reduced image.

19. At least one non-transitory machine readable medium comprising a plurality of instructions that, in response to being executed on a device, cause the device to provide temporal noise reduction by:
generating a noise reduced image based on a noise reduction of an input image, a noise stream corresponding to the input image based on the input image and the noise reduced image, a content level map based on content detection performed using the noise reduced image, a local motion map based on local motion estimation performed using the noise reduced image and a reference image corresponding to the input image, and a local luminance map based on the noise reduced image;
performing trajectory break detection on the local motion map to generate a final local motion map;
adjusting the noise stream based on the content level map and the local luminance map; and
adaptively combining at least a portion of the noise stream with the reference image and a second noise reduced image corresponding to the input image to generate a temporal noise reduced output image, wherein adaptively combining the portion of the noise stream comprises applying the noise stream based on the final local motion map.

20. The non-transitory machine readable medium of claim 19, wherein the final local motion map comprises a first location having a first motion value and a second location having a second motion value greater than the first motion value, and wherein applying the noise stream comprises applying the noise stream at a greater level at the first location than the second location.

21. The non-transitory machine readable medium of claim 19, wherein the final local motion map comprises a first location having a first motion value less than a threshold and a second location having a second motion value greater than the threshold, and wherein applying the noise stream comprises applying the noise stream at the first location and not applying the noise stream at the second location.

22. The non-transitory machine readable medium of claim 19, wherein adjusting the noise stream comprises applying a local luminance dependent gain to the noise stream, wherein the local luminance map has a first local luminance value at a first location and a second local luminance value less than the first local luminance value at a second location, and wherein the local luminance dependent gain provides a first local luminance gain value for the first location and a second local luminance gain value greater than the first local luminance gain value for the second location responsive to the local luminance map.

23. The non-transitory machine readable medium of claim 19, wherein adjusting the noise stream comprises applying a content level dependent gain to the noise stream, wherein the content level map has a first content detection value at a first location and a second content detection value less than the first content detection value at a second location, and wherein the content level dependent gain provides a first content level gain value for the first location and a second content level gain value less than the first level dependent gain value for the second location responsive to the content level map.

24. The non-transitory machine readable medium of claim 19, wherein adjusting the noise stream is further based on a radial distance from an optical center by applying a radial distance dependent gain to the noise stream, wherein a first radial distance adaptive gain value for a first location is less than a second radial distance adaptive gain value for a second location responsive to the first location being a greater distance from the optical center than the second location.

25. The non-transitory machine readable medium of claim 19, wherein the input image and the noise stream are in a color filter array domain and the non-transitory machine readable medium further comprising instructions that cause the device to provide temporal noise reduction by:
demosaicing the noise reduced image to generate a demosaiced image;
applying spatial noise reduction to the demosaiced image to generate the second noise reduced image; and
converting the noise stream to a luma noise stream prior to adaptively combining the noise stream with the reference image and the second noise reduced image.

\* \* \* \* \*